United States Patent [19]

Zhou et al.

[11] Patent Number: 6,064,690

[45] Date of Patent: May 16, 2000

[54] SPREAD SPECTRUM COMMUNICATION SYSTEM

[75] Inventors: Changming Zhou; Xuping Zhou; Guolinag Shou, all of Tokyo, Japan

[73] Assignee: Yozan Inc., Tokyo, Japan

[21] Appl. No.: 09/075,861

[22] Filed: May 12, 1998

[51] Int. Cl.$^7$ ................................................. H04B 1/69
[52] U.S. Cl. ..................... 375/207; 375/206; 375/208; 370/342
[58] Field of Search ................................. 375/200, 206, 375/208, 207, 347; 714/728, 739; 370/342, 441, 335, 515

[56] References Cited

U.S. PATENT DOCUMENTS

| | | | |
|---|---|---|---|
| 4,538,281 | 8/1985 | Rajan | 380/31 |
| 5,068,872 | 11/1991 | Schroter | 375/200 |
| 5,305,349 | 4/1994 | Dent | 370/209 |
| 5,761,239 | 6/1998 | Gold et al. | 375/206 |
| 5,892,774 | 4/1999 | Zehavi et al. | 370/527 |

*Primary Examiner*—Stephen Chin
*Assistant Examiner*—Lenny Jiang
*Attorney, Agent, or Firm*—Pillsbury Madison & Sutro LLP

[57] ABSTRACT

A spread spectrum communication system wherein spreading codes for in-phase and quadrature components are composed by addition and subtraction and the received signal is multiplied by these composed codes for despreading. The communication system comprises a transmitter generating in-phase and quadrature components. The transmitter includes a spreading circuit for spreading the in-phase and quadrature components. The system further includes a receiver, a phase correction circuit for correcting the phase of despreaded components, a rake combiner for combining the components corrected by the phase correction circuit and a circuit for outputting a combined signal and a delay detection circuit for delaying detection of the combined signal. The receiver also comprises a provisional judgment portion for judging the phase of a pair of the in-phase and quadrature phase components. The phase correction circuit corrects the phase according to the phase judged by the provisional judgment portion.

16 Claims, 24 Drawing Sheets

| Time | OUT4 | OUT2 | OUT1 | OUT0 |
|---|---|---|---|---|
| 0 | 0 | 0 | 1 | 1 |
| 1 | 0 | 1 | 0 | 1 |
| 2 | 1 | 0 | 1 | 0 |
| 3 | 1 | 0 | 0 | 1 |
| 4 | 1 | 1 | 0 | 0 |
| 5 | 0 | 1 | 1 | 0 |
| 6 | 1 | 1 | 1 | 1 |
| 7 | 0 | 0 | 1 | 1 |
| 8 | 0 | 1 | 0 | 1 |
| 9 | 1 | 0 | 1 | 0 |
| 10 | 1 | 0 | 0 | 1 |

Fig.28

| T | 4 | 3 | 2 | 1 | 0 | A | 4 | 3 | 2 | 1 | 0 | B | GOLD1 | GOLD2 |
|---|---|---|---|---|---|---|---|---|---|---|---|---|---|---|
| 0 | 1 | 1 | 1 | 1 | 1 | 0 | 1 | 1 | 1 | 1 | 1 | 1 | 0 | 1 |
| 1 | 0 | 1 | 1 | 1 | 1 | 1 | 0 | 1 | 1 | 1 | 1 | 1 | 0 | 0 |
| 2 | 0 | 0 | 1 | 1 | 1 | 1 | 0 | 0 | 1 | 1 | 1 | 0 | 0 | 1 |
| 3 | 0 | 0 | 0 | 1 | 1 | 1 | 1 | 0 | 0 | 1 | 1 | 0 | 0 | 1 |
| 4 | 1 | 0 | 0 | 0 | 1 | 0 | 1 | 1 | 0 | 0 | 1 | 0 | 0 | 0 |
| 5 | 1 | 1 | 0 | 0 | 0 | 1 | 0 | 1 | 1 | 0 | 0 | 0 | 0 | 1 |
| 6 | 0 | 1 | 1 | 0 | 0 | 0 | 1 | 0 | 1 | 1 | 0 | 1 | 0 | 1 |
| 7 | 1 | 0 | 1 | 1 | 0 | 1 | 1 | 1 | 0 | 1 | 1 | 0 | 1 | 1 |
| 8 | 1 | 1 | 0 | 1 | 1 | 0 | 0 | 1 | 1 | 0 | 1 | 1 | 1 | 1 |
| 9 | 1 | 1 | 1 | 0 | 1 | 0 | 0 | 0 | 1 | 1 | 0 | 1 | 1 | 1 |
| 10 | 0 | 1 | 1 | 1 | 0 | 0 | 0 | 0 | 0 | 1 | 1 | 0 | 1 | 0 |
| 11 | 1 | 0 | 1 | 1 | 1 | 0 | 0 | 0 | 0 | 0 | 1 | 1 | 0 | 1 |
| 12 | 0 | 1 | 0 | 1 | 1 | 1 | 1 | 0 | 0 | 0 | 0 | 0 | 1 | 1 |
| 13 | 1 | 0 | 1 | 0 | 1 | 0 | 0 | 1 | 0 | 0 | 0 | 1 | 1 | 1 |
| 14 | 0 | 1 | 0 | 1 | 0 | 0 | 1 | 0 | 1 | 0 | 0 | 0 | 0 | 0 |
| 15 | 0 | 0 | 1 | 0 | 1 | 1 | 1 | 1 | 0 | 1 | 0 | 0 | 1 | 1 |
| 16 | 0 | 0 | 0 | 1 | 0 | 0 | 0 | 1 | 1 | 0 | 1 | 0 | 1 | 0 |
| 17 | 0 | 0 | 0 | 0 | 1 | 1 | 1 | 0 | 1 | 1 | 0 | 1 | 1 | 0 |
| 18 | 1 | 0 | 0 | 0 | 0 | 1 | 0 | 1 | 0 | 1 | 1 | 1 | 1 | 0 |
| 19 | 0 | 1 | 0 | 0 | 0 | 0 | 1 | 0 | 1 | 0 | 1 | 1 | 1 | 1 |
| 20 | 0 | 0 | 1 | 0 | 0 | 0 | 0 | 1 | 0 | 1 | 0 | 0 | 0 | 0 |
| 21 | 1 | 0 | 0 | 1 | 0 | 1 | 0 | 0 | 1 | 0 | 1 | 1 | 1 | 0 |
| 22 | 0 | 1 | 0 | 0 | 1 | 1 | 0 | 0 | 0 | 1 | 0 | 1 | 1 | 0 |
| 23 | 1 | 0 | 1 | 0 | 0 | 1 | 1 | 0 | 0 | 0 | 1 | 1 | 1 | 0 |
| 24 | 1 | 1 | 0 | 1 | 0 | 1 | 1 | 1 | 0 | 0 | 0 | 1 | 0 | 0 |
| 25 | 0 | 1 | 1 | 0 | 1 | 1 | 1 | 1 | 1 | 0 | 0 | 1 | 1 | 0 |
| 26 | 0 | 0 | 1 | 1 | 0 | 0 | 0 | 1 | 1 | 1 | 0 | 0 | 0 | 0 |
| 27 | 1 | 0 | 0 | 1 | 1 | 0 | 1 | 0 | 1 | 1 | 1 | 0 | 0 | 0 |
| 28 | 1 | 1 | 0 | 0 | 1 | 0 | 1 | 1 | 0 | 1 | 1 | 1 | 0 | 1 |
| 29 | 1 | 1 | 1 | 0 | 0 | 1 | 1 | 1 | 1 | 0 | 1 | 0 | 1 | 1 |
| 30 | 1 | 1 | 1 | 1 | 0 | 1 | 1 | 1 | 1 | 1 | 0 | 0 | 0 | 1 |
| 31 | 1 | 1 | 1 | 1 | 1 | 0 | 1 | 1 | 1 | 1 | 1 | 1 | 0 | 1 |

SPREAD SPECTRUM COMMUNICATION SYSTEM

BACKGROUND OF THE INVENTION

1. Field of the Invention The present invention relates to a spread spectrum communication system for the mobile communication, wireless LAN etc.

2. Description of Related Art

The spread spectrum communication system seems hopeful in the fields of mobile cellular radio and wireless LAN due to its frequency efficiency and confidentiality.

The modulation and demodulation of a direct-sequence code division multiple access (DS-CDMA) type spread spectrum communication are as follows.

On the transmitter side, the modulated signal consists of an in-phase component (I-component) Si and a quadrature component (Q-component) Sq.

$$Si = IiCi - IqCq \quad (1)$$

$$Sq = IiCq + IqCi \quad (2)$$

Here, information to be transmitted is divided into an I-component Ii and Q-component. Ci is a spreading code of an I-component and a Cq is a spreading code of a Q-component.

On the receiver side, the demodulated signal consists of an I-component Ri and a Q-component Rq.

$$Ri = IiCi - IqCq \quad (3)$$

$$Rq = IiCq - IqCi \quad (4)$$

$$Di = RiCi + RqCq \quad (5)$$

$$Dq = -RiCq + RqCi \quad (6)$$

Then, $$Di = Ii(Ci^2 + Cq^2) \quad (7)$$

$$Dq = Iq(Ci^2 + Cq^2) \quad (8)$$

Here, the received signal is despreaded and divided into the I- and Q-components Di and Dq.

FIG. 30 shows a conventional receiver including a matched filter of the CDMA communication system. An analog signal Ain4 of an intermediate frequency (IF), received by the receiver, is divided into the two signal components Ri and Rq. The carrier signal is removed by a low-pass filter LPF, then, Rq is input to matched filters MF1 and MF2 and Ri is input to matched filters MF3 and MF4. The spreading code Cq for Q-component is given from a code generator PNQ to MF2 and MF3, and spreading code Ci for I-component is given from a code generator PNI to MF1 and MF4. Each matched filter multiplies the signal component of successive time sequences by the spreading code and sums them up.

FIG. 31 shows a conventional receiver including a sliding correlator, which converts the received signal Ain5 of the IF into I- and Q-components by the quadratic detector and LPF. The I- and Q-components are multiplied by Cq and Ci by four multipliers shown by X. Then, the I- and Q-components are composed by the adders similarly to the above. The result of the composition is coherently tracked and a correlation peak is detected.

In such a communication system of a plurality of components divided from the signal to be transmitted, the more the number of components becomes, the higher the communication speed is. The communication capacity becomes better. The communication reliability is improved in view of error ratic etc. However, the communication apparatus becomes more expensive and the electrical power consumption increases.

FIG. 32(A) shows a frame format of transmission data of DS-CDMA communication. Each frame consists of one pilot symbol block P1, P2, . . . , Pn and one information symbol block I1, I2, . . . , In, respectively. Each pilot block has predetermined L symbols, or pits L can be, for example, "4". Each information block has predetermined number, for example "36", of symbols or bits. These symbols are modulated by QPSK and spreaded by the predetermined spreading code sequence.

At the receiver, a fading complex envelope is estimated from the pilot symbols and fading compensation is performed by using the estimated envelope. The coherent detection and rake combining are performed. A frame synchronization signal is output when the pilot symbol block is of a predetermined pattern.

FIG. 32(B) shows a conventional rake receiver. Each I- and Q-component of an output of a complex matched filter 80 is input to a delay profile detection circuit 82, a signal level detection circuit 84 and a phase correction circuit 86. The first path of the multi-path is detected by the circuit 82 which outputs a signal to a frame synchronization circuit 83 for detecting a timing of the frame synchronization. The timing is input to a phase correction portion 86. A rake combiner 87 and a data decision portion 88 are serially connected to the phase correction portion 86.

The phase correction portion calculates a phase rotation of the pilot symbol by comparing the received pilot symbol with a predetermined pilot symbol. Then, a correction vector is calculated for compensating the phase error due to fading etc.

In the spread spectrum communication system for wireless local area network (LAN) etc., the information is differentially encoded at a transmitter. At the receiver, the delay detection is performed according only to the strongest path among multi-path, so the accuracy of the frame synchronization detection is rather low. The reliability of the received data is low.

SUMMARY OF THE INVENTION

The present invention is invented so as to solve the conventional problems and has an object to provide a spread spectrum communication system of small circuit size, high communication capacity and low electric power consumption.

According to the present invention, spreading codes for in-phase and quadrature components are composed by addition and subtraction and the received signal is multiplied by these composed code for despreading.

According to the present invention, a multi-path signal is provisionally judged by one path so that phase compensation can be performed. The signal compensated is combined by a rake combiner.

BRIEF DESCRIPTION OF DRAWINGS

FIG. 28 is a table showing the operation of a Gold sequence generating circuit.

PREFERRED EMBODIMENT OF THE PRESENT INVENTION

Figure 1:
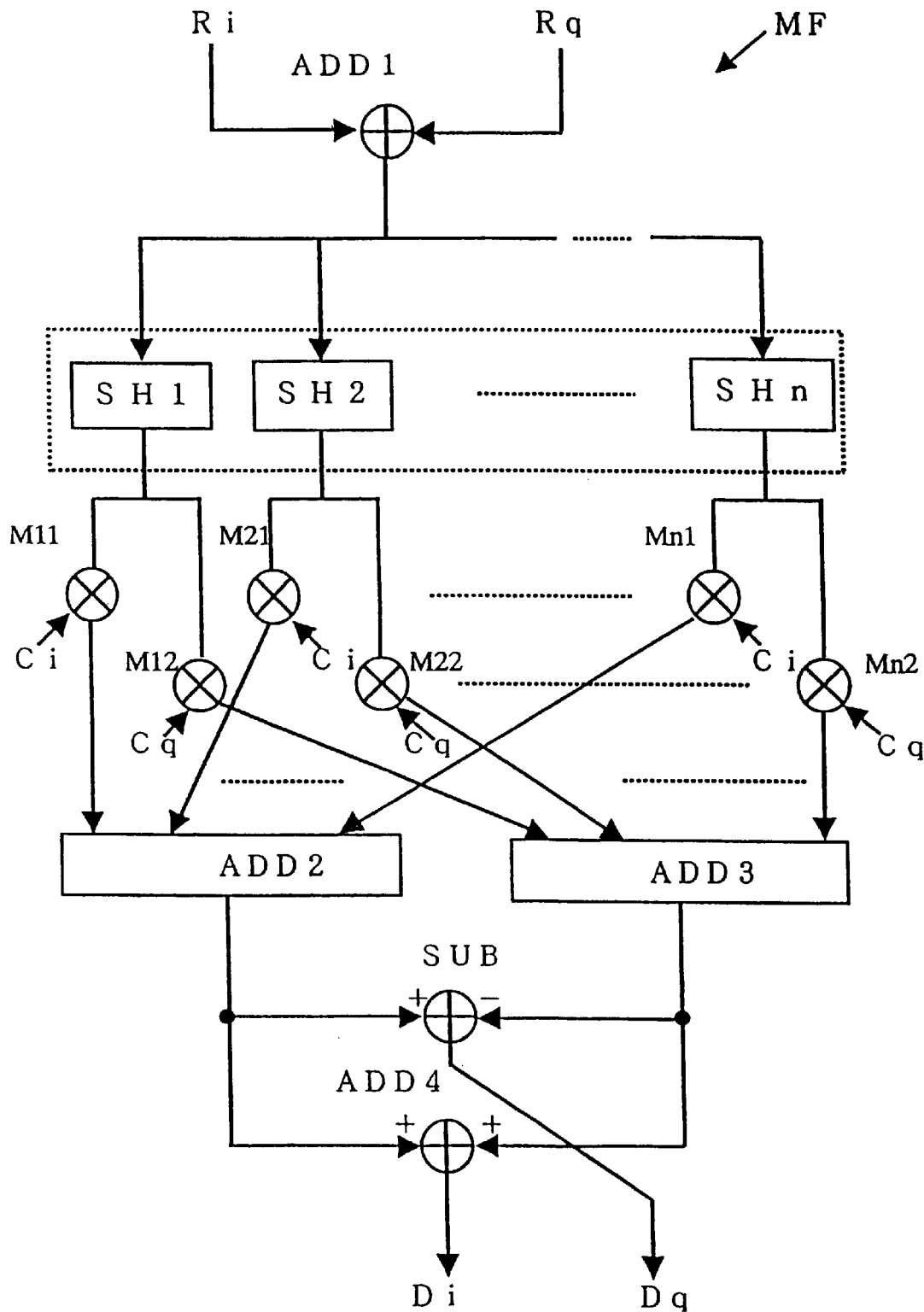
FIG. 1 is a block diagram of the first embodiment of a matched filter used for the communication method according to the present invention.

FIG. 1 shows a matched filter for the present invention. The matched filter has sampling and holding circuits SH1 to SHn corresponding to spreading ratio n of the matched filter MF. An in-phase component (I-component) Ri and a quadrature component (Q-component) Rq of a received signal are added by the first adder ADD1 and input to the sampling and holding circuits SH1 to SHn. The sampling and holding circuits are controlled by a control signal (not shown) so as that SH1, SH2, . . . , SHn successively and in a circular manner sample and hold successive outputs from the adder ADD1 along the time sequence. Since the data to be held by the sampling and holding circuits are not transferred between adjacent sampling and holding circuits, the transfer error of data does not occur. The spreading code sequence Ci and Cq are sifted and circulated synchronously to the sampling and holding in response to a clock chip rate.

Outputs of the sampling and holding circuits SH1 to SHn are input to multiplication circuits M11, M21, . . . , Mn1 for the I-component and to multiplication circuits M12, M22, . . . , Mn2 for the Q-component. The PN code Ci for the I-component is input to M11 to Mn1 and PN code Cq for the Q-component is input to M12 to Mn2. Outputs from M11 to Mn1 are input to the second adder ADD2 so as to be summed up to be a total summation of I-components, and outputs from M12 to Mn2 are input to the third adder ADD3 so as to be summed up to be a total summation of the Q-component. The outputs of the ADD2 and ADD3 are input to the fourth adder ADD4 and a subtraction circuit SUB.

An addition R of the I-component Ri and Q-component Rq are given by the formula (9).

$$R = Ri + Rq = IiCi - IqCq + IiCq + IqCi \tag{9}$$

The outputs of ADD4 and SUB are approximately expressed as in the formulae (10) and (11).

$$Di = R \cdot (Ci + Cq) = R \cdot Ci + R \cdot Cq \tag{10}$$
$$= Ii \cdot (Ci^2 + Cq^2) + Iq \cdot (Ci^2 - Cq^2) + 2Ii \cdot Ci \cdot Cq$$

$$Dq = R \cdot (Ci - Cq) = R \cdot Ci - R \cdot Cq \tag{11}$$
$$= Iq \cdot (Ci^2 + Cq^2) + Ii \cdot (Ci^2 - Cq^2) - 2Iq \cdot Ci \cdot Cq$$

When Ci≠Cq, and the I-component and Q-component are quasi-orthogonal to each other, the formulae (12) and (13) are true.

$$Ci \bullet Cq \approx 0 \tag{12}$$
$$Ci^2 - Cq^2 \approx 0 \tag{13}$$

By substituting the formula (10) and (11) by the formulae (12) and (13), the formulae (10) and (11) are the same as the formulae (7) and (8).

Since Cq and Ci are quasi-orthogonal to each other, that is, of low correlation to each other, the determination whether the received signal is oriented to the receiver is possible if one of the components is not too deteriorated. The error correction is also possible. The quasi-orthogonal means "orthogonal" including a correlation of "0".

The communication reliability is equal to a communication using of two channels, however the number of sampling and holding circuits SH1 to SHn is equivalent to that of one communication channel of the conventional system. Therefore, the circuit size of this embodiment is much smaller than that of the conventional circuit.

The correlation between the I- and Q-components cannot be neglected when considering the terms on the left side of the formulae (12) and (13) due to errors during communication path. The correlation output (electrical power) is averaged through recursive integration with respect to time for decreasing the influence of the correlation.

Figure 2:
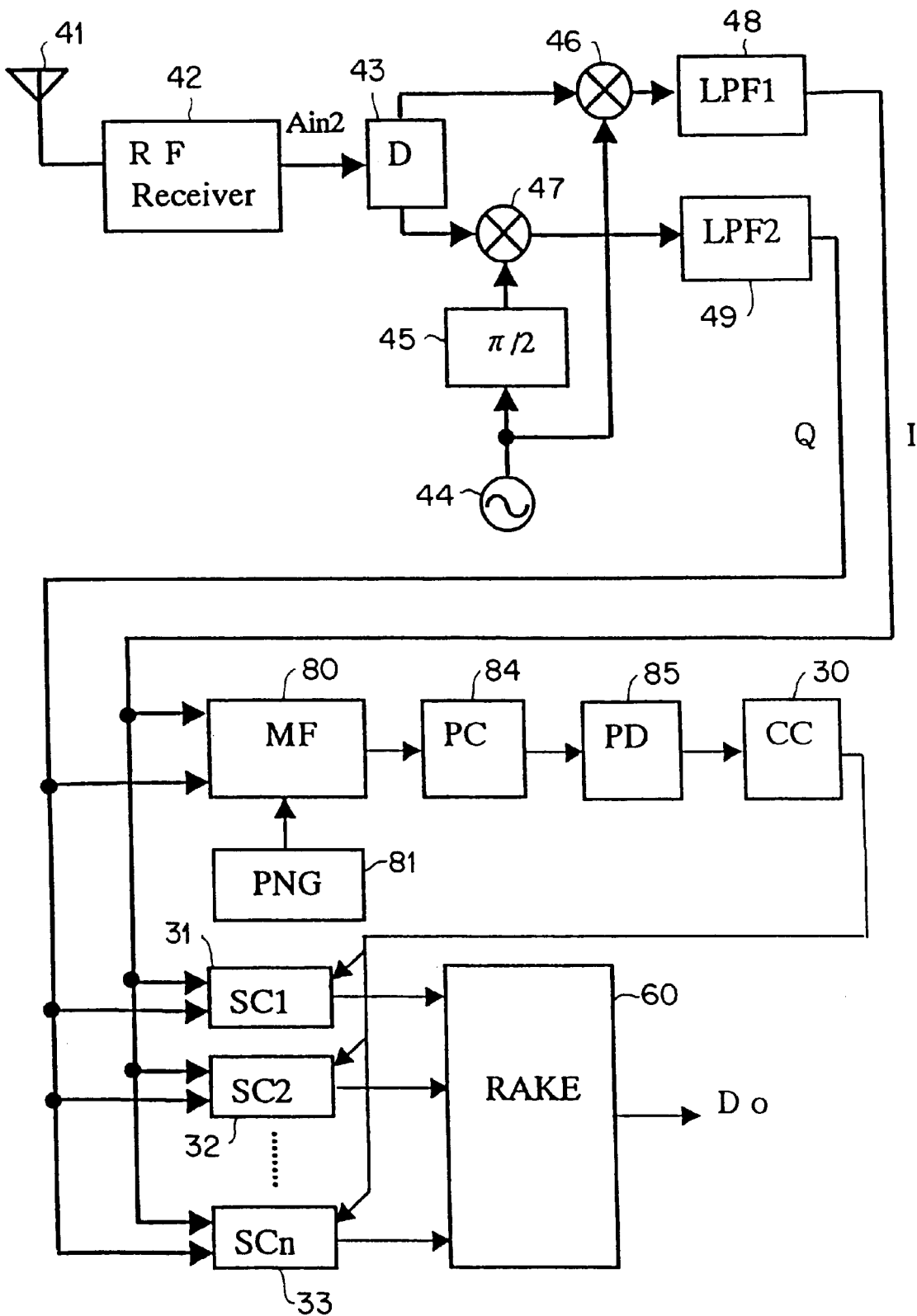
FIG. 2 is a block diagram of a receiver system used for the present invention.

FIG. 2 shows a receiver applied to the communication system according to the present invention. The received signal Ain2 by the antenna system 41 and a RF receiver portion 42 is divided by a divider D43 into 2 signals which are converted by a quadratic detector into I- and Q-components, respectively. The carrier signal is removed by low-pass filters LPF148 and LPF249 from the components so that the I- and Q-components are extracted. The components are input to matched filter MF for approximately calculating I- and Q-components by the calculation of formulae (7) to (13) using PN code supplied from the PN generator PNG 81.

The outputs from LPF148 and LPF249 are input in parallel to a plurality of sliding correlators SC1 to SCn. The matched filter MF 80 is used only for the acquisition of the received signal and the sliding correlators are used for data demodulation and tracking. As shown in the formulae (12) and (13), the output of the matched filter is nearly equal to the I- and Q-components, however the I- and Q-components may not be well divided due to noise. The sliding correlators 31–33 calculate simple multiplication of the received signal RS and the PN code, so the components are well divided. The sliding correlators 31–33 cannot perform fast acquisition because only one multiplication circuit is provided for each sliding correlator 31, 32 or 33. The combination of the matched filter 80 for acquisition and the sliding correlators for demodulation and for tracking realizes fast acquisition without enlarging the circuit size. The demodulation performance is high.

The output of the matched filter 80 is input to a power calculation portion PC 84 for calculating the electrical power of the output. The calculation result is recursively integrated by a path-detector PD 85 for selecting predetermined number of signal paths of higher levels. These paths occurs due to reflections etc. during the communication path. An output of PD is input to correlation controller CC 30 for controlling the sliding correlators SC1 to SCn 31–33; and so that the sliding correlators are synchronized with the selected paths. The synchronized signals are demodulated by the sliding correlators and outputs from them are combined by a rake 60 combiner RAKE. Do in FIG. 2 is an output after the rake combining.

Figure 3:
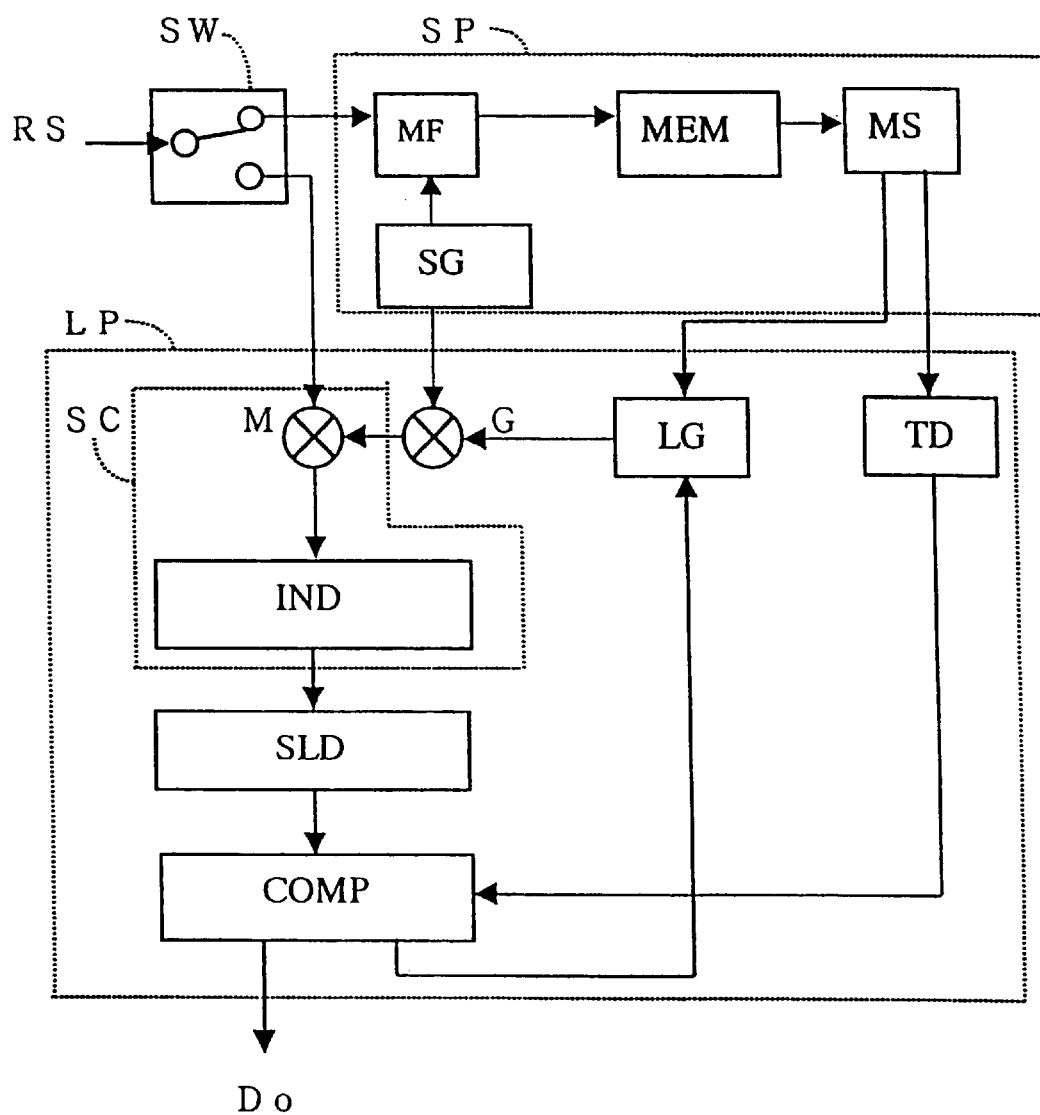
FIG. 3 shows another receiver.

FIG. 3 shows a receiver for two-stage rapid acquisition method proposed in "Two-Stages Rapid Long Code Acquisition Scheme in DS-CDMA Asynchronous Cellular System", Kennichi Higuchi, the TECHNICAL REPORT OF IEICE, CS96-19, RCS96-12(1996-05).

In this method, a common short code for every base station and proper short codes for the base stations different from one another are defined, and two steps demodulation of these short codes is performed when the control channel is transmitted. The control channel is transmitted every predetermined period with two-stage spreading modulation. At the receiver, a timing of a long code is detected from the demodulated signal by the short codes. The acquisition of the long code becomes faster.

In FIG. 3, RS through the divider and the low-pass filter is input to a switch SW for selectively outputting the signal into two outputs. The first output is input to a short code processor SP and the second is input to a long code processor LP. The SP includes the matched filter MF and a short code generator SG for inputting the short code into MF. The SP calculates correlation of RS and the shot code so as to detect the long code timing for initial cell search and peripheral cell search. The LP includes the sliding correlators and a long code generator LG for inputting the long code into the sliding correlators. The LP calculates correlation of RS and a combined code of the short codes and the long code so as to demodulate the signal.

The output of MF is input to a memory MEM for registering a plurality of electrical power levels. A maximum extraction portion MS is connected to MEM for selecting the maximum of the power. An output of MS is input to LG. MS generates a timing of the correlation calculation between RS and the long code, that is, a timing of generating of the long code, according to the calculation by the sliding correlator SC. The short code is combined with the long code by an exclusive-or gate G. The combined code is input to a multiplier M. Then, the two-stages demodulation is completed and the long code synchronization is established.

In SC, an output of the multiplier is input to an integrator IND for integrating the multiplication result. A square-law detector SLD is connected to an output IND and a comparator CMP is connected to an output of SLD.

A threshold determining circuit TD is connected to an output of MS so that COMP compares the output of SLD with an output of TD. The correlation of the signal with the short code is converted into the power which is compared with a threshold determined by TD. Since TD determines the threshold from the power detection in SP, an appropriate threshold is obtained. The long code synchronization signal Do is appropriate.

Figure 4:
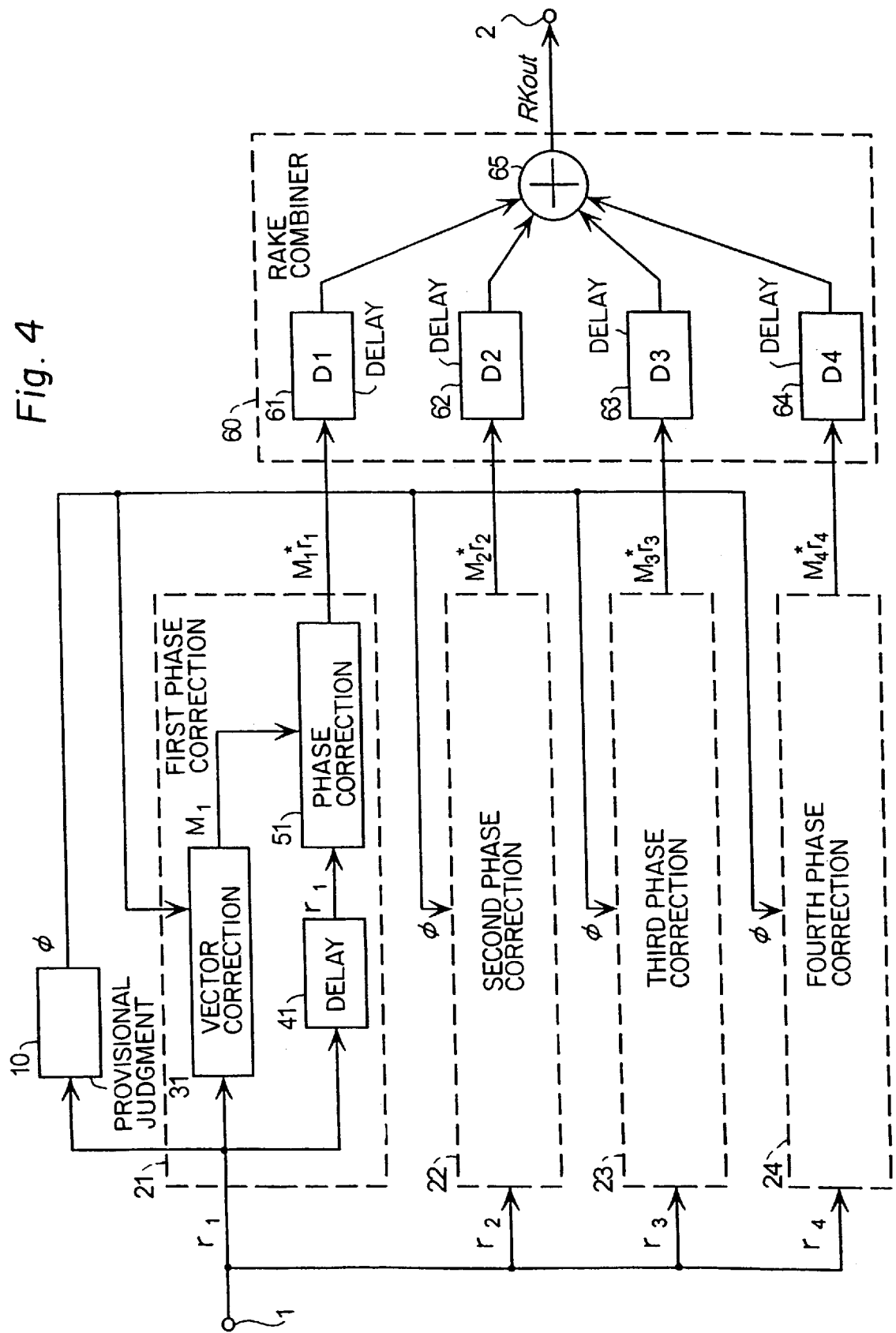
FIG. 4 shows a main portion of the third embodiment of a receiver according to the present invention.

FIG. 4 is a block diagram of the next embodiment of the present invention of a multi-path of four paths. This embodiment is applicable to other numbers of multi-path. In FIG. 4, there is provided a signal input portion 1 to which I- and Q-components output from a matched filter are input. The multi-path signal consists of signals r1, r2, r3 and r4 corresponding to the first path #1, the second path #2, the third path #3 and the fourth path #4, respectively.

In FIG. 4, the reference 10 designates a provisional judgment portion 10 for provisionally judging the transmission symbol of r1, 21 designates the first phase correction means for r1, 22 designates the second phase correction means for r2, 23 designates the third phase correction means for r3, and 24 designates the fourth phase correction means for r4. The reference 60 designates a rake combiner, 61 to 64 designate delay means for giving predetermined delay time to outputs of the phase correction means 21 to 24. 65 designates an adder for adding outputs from the delay means 61 to 64 together and for outputting the addition result at an output terminal 2.

The phase correction means 21 includes a correction vector calculation portion 31 for calculating a correction vector M1 from a phase signal $\phi$ output from the provisional judgment portion 10 and the r1. Block 41 designates a memory for delaying r1 by a time necessary for the correction rector calculation. The capacity of the memory is smaller than the conventional system.

Block 51 designates a phase correction circuit for performing phase correction of r1 output from the memory 41 using the correction vector M1 output from the correction vector calculation portion 31. An output of the phase correction circuit 51 is input to the first delay means 61.

Other phase correction means 22 to 24 are similar to 21, which have correction vector calculation portions 32 to 34 (not shown), memories 42 to 44 (not shown) and phase correction circuits 52 to 54 (not shown).

Figure 5:
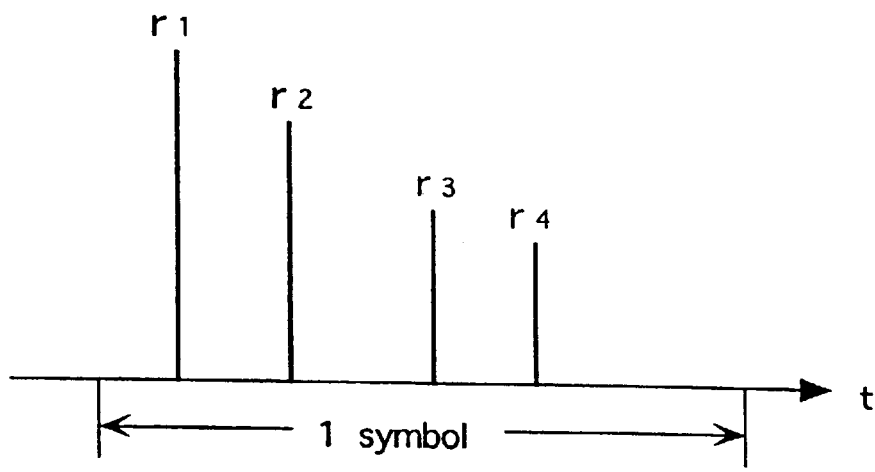
FIG. 5 is a diagram showing a received signal under a condition of multi-path.

FIG. 5 shows an example of the received signal received at the terminal 1. A base-band signals r1, r2, r3 and r4 passed through different paths are output from the complex matched filter. The signals are expressed as in the formulae (14) to (17).

$$r1 = fd1e^{j\theta 1}e^{j\alpha}e^{j\beta} = fd1e^{j(\theta 1+\alpha+\beta)} = R1I + jR1q \quad (14)$$

$$r2 = fd2e^{j\theta e}e^{j\alpha}e^{j\beta} = fd2e^{j(\theta 2+\alpha+\beta)} \quad (15)$$

$$r3 = fd3e^{j\theta 3}e^{j\alpha}e^{j\beta} = fd3e^{j(\theta 3+\alpha+\beta)} \quad (16)$$

$$r4 = fd4e^{j\theta 4}e^{j\alpha}e^{j\beta} = fd4e^{j(\theta 4+\alpha+\beta)} \quad (17)$$

Here, $fd_i e^j \theta^1$ is a complex coefficient of ith (i=1 to 4) path, fdi is its amplitude component and $\theta^1$ is its phase component. $\alpha$ is a phase of information modulation and $\beta$ is an initial phase error of the carrier wave.

The provisional judgment portion provisionally judges I-component r1i and Q-component r1q of r1 according to the formulae (18) and (19).

$$SI=0 \text{ if } r1I<0, SI=1 \text{ if } r1I \geq 0 \quad (18)$$

$$SQ=0 \text{ if } r1Q<0, SI=1 \text{ if } r1q \geq 0 \quad (19)$$

Figure 6:
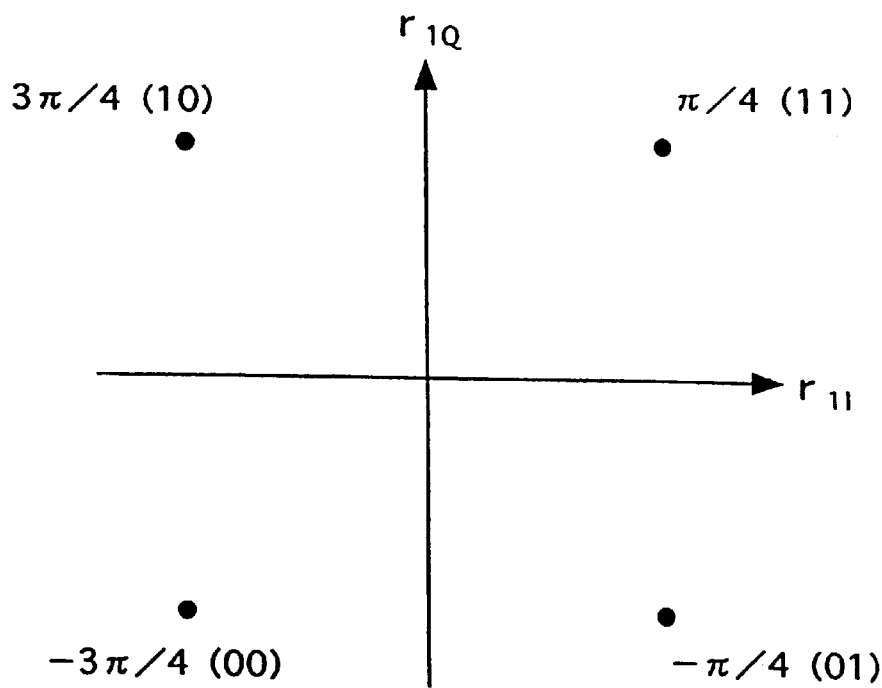
FIG. 6 is a diagram showing a provisional judgment of a signal of QPSK modulation.

FIG. 6 shows a relationship between data SISQ to be modulated and the phase $\phi$, that is, a result of the provisional judgment. The portion 10 judges SI=0 when r1I<0, SI=1 when r1I≧0, SQ=0 when r1Q<0 and SQ=1 when r1Q≧0. It means that (SISQ)=(11) and $\phi=\pi/2$ when r1 is of the first quadrant, that is, its phase is from 0 to $\pi/2$, that (SISQ)=(10) and $\phi=3\pi/4$ when r1 is of the second quadrant, that (SISQ)=(00) and $\phi=-3\pi/4$ when r1 is of the third quadrant and that (SISQ)=(01) and $\phi=-\pi/4$ when r1 is of the fourth quadrant. If there were no noise or fading, $\phi=\alpha$ ($\alpha$:phase of information modulation). However, the phase $\phi$ of r1 is $\phi=\alpha+\Delta\alpha$ due to noise and fading. The provisional judgment output $\phi$ (=$\alpha+\Delta\alpha$) is input to the phase correction means 21 to 24 for correcting the phase of r1 to r4. By this correction, the phase of r1 to r4 is synchronized with $\phi$. The phase correction means 22 to 24 are similar to the means 21, so only the means 21 is described.

The correction vector calculation portion 31 calculates M1 by multiplying r1 by a conjugate complex number of $\phi$ as shown in the formula (20).

$$Mi = rie^{-j\phi} = fdie^{j(\theta i+\alpha+\beta-\phi)} = fdle^{j(\theta i+\beta-\Delta\alpha)} \quad (20)$$

The phase component of the correction vector M1 consists only of $\theta 1$ depending on the fading and $\Delta\alpha$ depending on the initial phase error $\beta$ and $\theta 1$, without the phase $\alpha$ corresponding to the information modulation.

Referring back to FIG. 4, the phase correction portion 51 multiples r1 by a conjugate vector M1 * of M1 so as to output M1*r1. Other phase correction means 22 to 24 similarly outputs a corrected signal M2*r2, M3*r3 and M4*r4, respectively. These outputs are adjusted in timing in the delay circuits 61 to 64 to be synchronized and added by the adder 65. A combined output RKout of rake combining is obtained according to the formula (21).

$$RKout = \sum_{i=1}^{4}(M_i^* ri) \quad (21)$$

$$= \sum_{i=1}^{4}(fdie^{-j(\theta i+\beta-\Delta\alpha)})(fdie^{j(\theta i+\alpha+\beta)})$$

$$= \left\{\sum_{i=1}^{4}fd_i^2\right\}e^{j(\alpha+\Delta\alpha)}$$

The phase of RKout is an addition of the information modulation $\alpha$ and the error $\Delta\alpha$. In the condition of rather high S/N ratio and of small change in fading coefficient, $\Delta\alpha$ is substantially constant for all the symbols. When S/N ratio is low and fading coefficient changes steeply, $\Delta\alpha$ changes quickly. While, $\alpha$ changes in response to the information. An output of the formula (22) is obtained by inputting RKout to a delay detection circuit. The delay detection output D corresponding to RKout(j−1) of (j−1)th symbol and RKout (j) of (j−1)th symbol is expressed by the formula (22).

$$D = RKout^*(j-1)RKout(j) = D1 + jDq \quad (22)$$

In the formula (22), $\Delta\alpha$ is deleted and a signal of phase difference between jth and (j−1)th symbol is output. Therefore, a delay detection signal without phase error can be obtained by the rake combining signal of multi-path signal.

Figure 7:
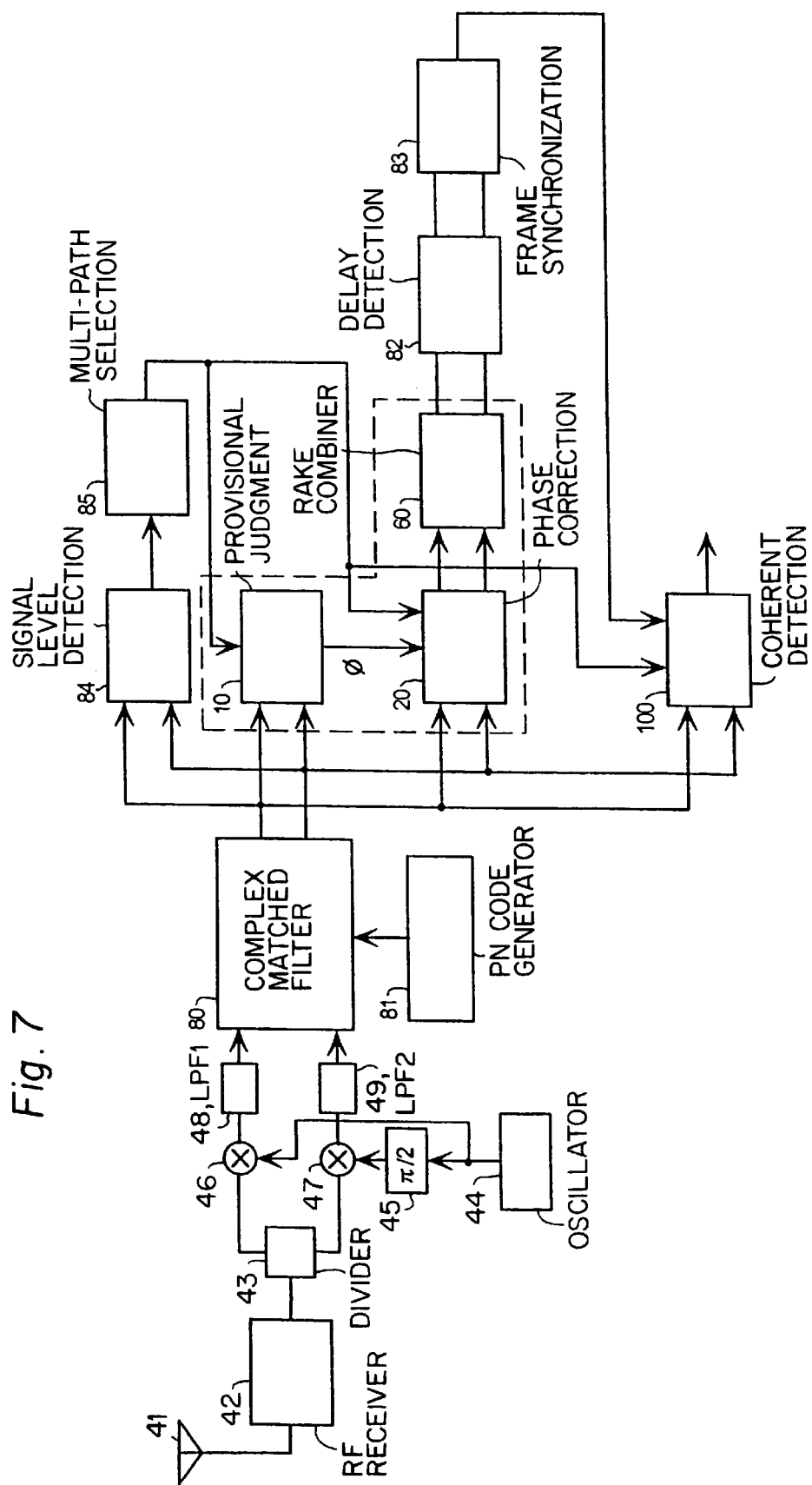
FIG. 7 is a block diagram of a rake receiver according to the present invention applied to DS-CDMA communication method.

FIG. 7 is a receiver for DS-CDMA communication using the above embodiment for improving accuracy of frame synchronization. The provisional judgment portion 10 is connected to a complex matched filter 80 which outputs a base-band signal corresponding to a plurality of paths. A multi-path selection portion 85 is connected to the matched filter 80 for selecting a predetermined number of multi-path signals of higher power. The portion 10 performs the provisional judgment corresponding to the path with the highest power selected by the portion 85 for outputting $\phi$. The signal $\phi$ is input to the phase correction portion 20 in which the phase correction means 21 to 24 synchronize the received signal with the phase judged by the portion 10. The synchronized signal is combined by the rake combiner 60. The rake combining output RKout is input to a delay detection circuit 82 output of which is input to a frame synchronization circuit 83. The circuit 83 detects matching of series of delay detection outputs with information pattern of predetermined pilot symbols so that a frame synchronization is detected. An output of frame synchronization is input to a coherent detection circuit 100. The circuit 100 receives an output of the matched filter 80 for coherent synchronization of the received signal of information symbol block according to the frame detection signal. The circuit 100 includes a phase correction portion 86, a rake combiner 87 and a data decision circuit 88.

The frame synchronization is accurate because the rake combining output is delay detected relative to the conventional system.

Figure 8:
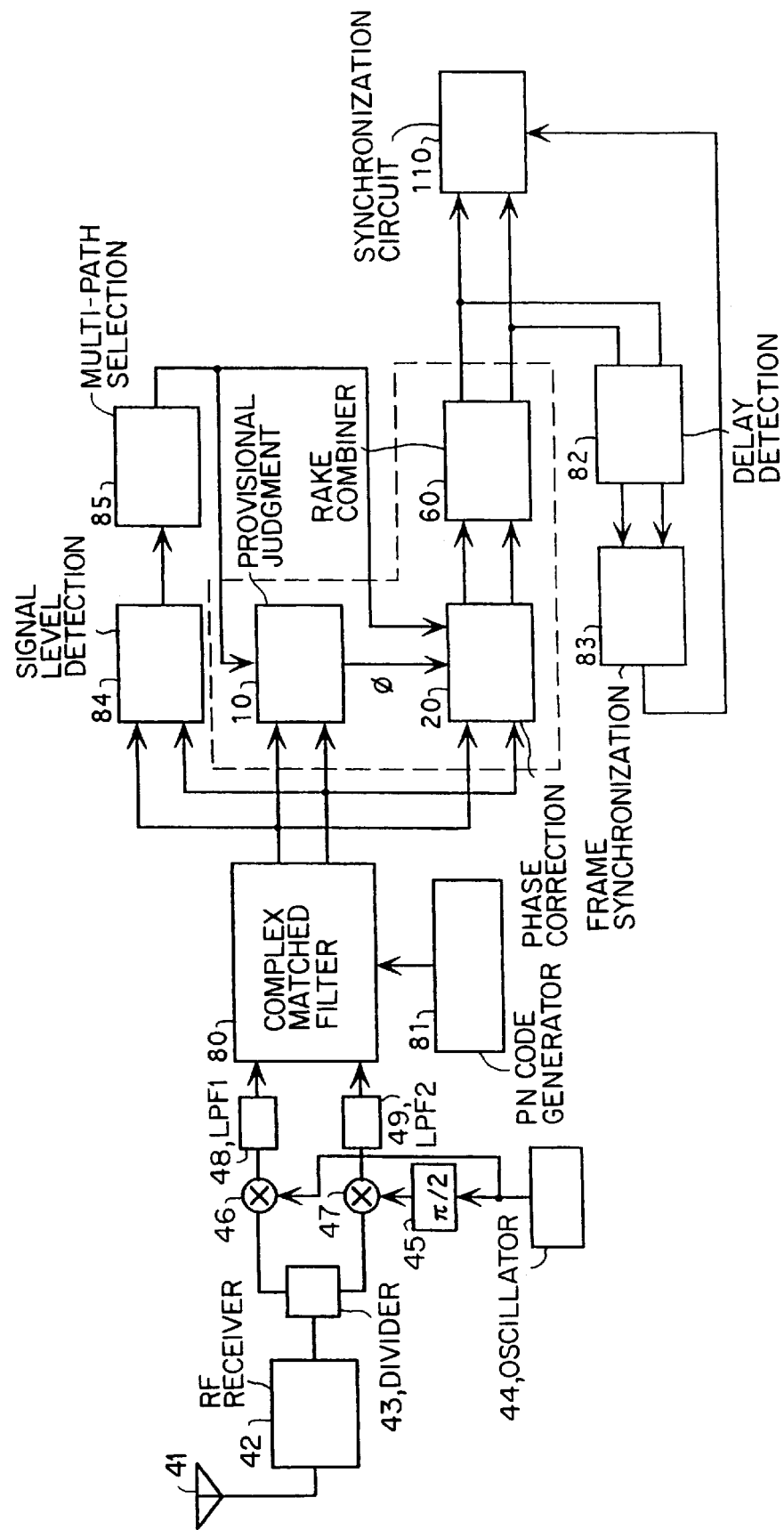
FIG. 8 is a block diagram of another rake receiver according to the present invention applied to DS-CDMA communication method.

FIG. 8 shows another receiver in which an output of the rake combiner 60 is parallelly output to a synchronization circuit 110 and a delay detection circuit 82. Both of the pilot symbol block and information symbol block of the received signal are input to the phase correction portion 20 and the rake combiner 60. The delay detection circuit 82 and the frame synchronization circuit 83 are serially connected to the rake combiner 60. The output of the circuit 83 is input to the coherent synchronization circuit 110. The output of the rake combiner 60 is input to the circuit 110 for coherent synchronization. The signal from the rake combiner is the combined data of multi-path signal, so the output of the circuit 110 comprises data after phase correction as well as data decision. However, the influence of fading still exists because the synchronization is based on the phase φ of the provisional judgment. It is necessary to compensate the phase error by the phase correction portion 86 included within the information symbol output from the rake combiner 60. The compensated signal is then judged by a data decision portion 88. This embodiment is smaller in circuit size than the embodiment in FIG. 7. In this embodiment, the differential BPSK (DBPSK) or the differential QPSK (DQPSK) is applied at the transmitter so that pilot signal is not necessary for fading compensation. The transmission efficiency is improved.

Figure 9:
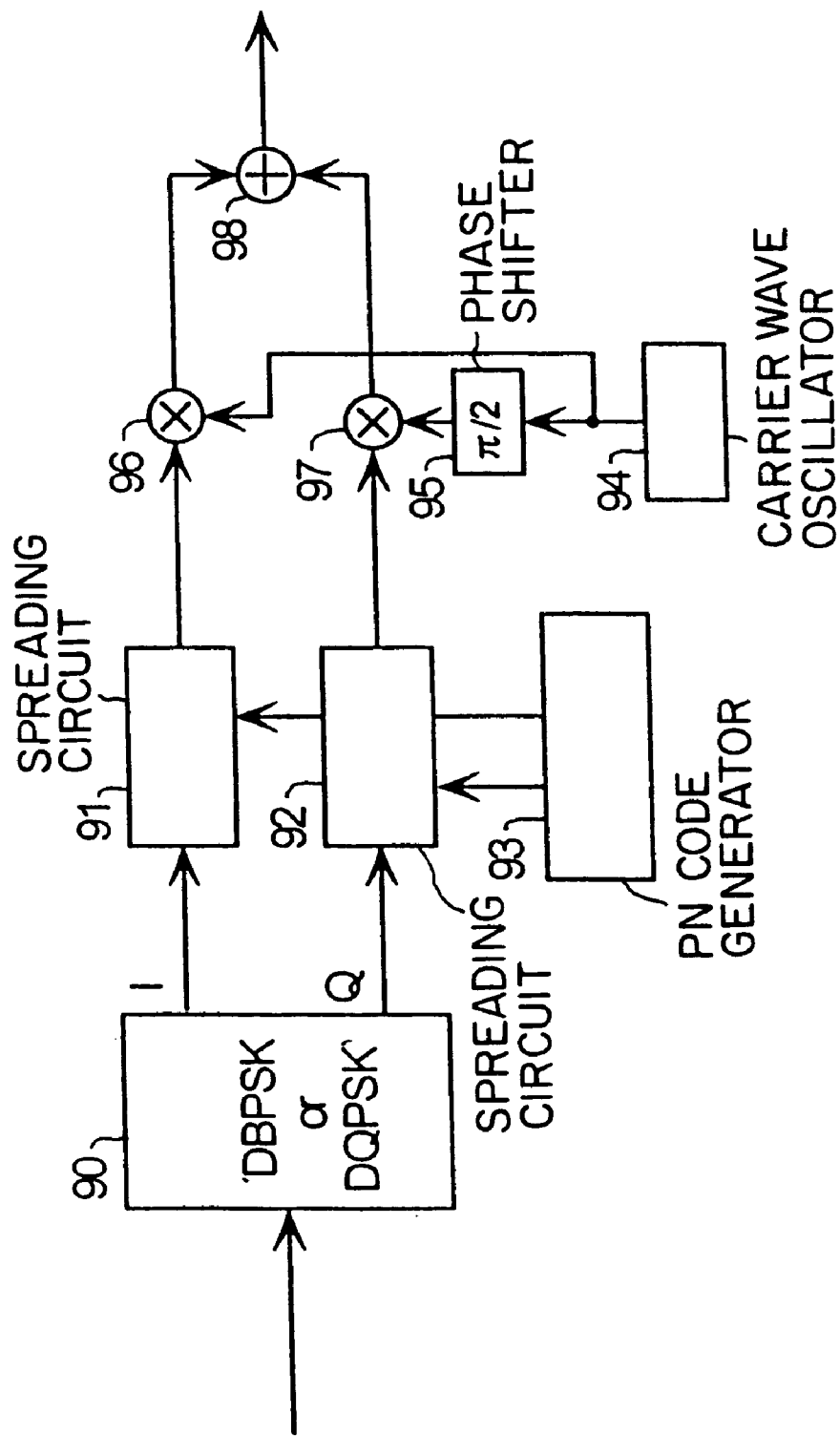
FIG. 9 is a block diagram of a transmitter according to the present invention applied to a spread spectrum communication system.

FIG. 9 shows a transmitter corresponding to the receiver in FIG. 8. In FIG. 9, the reference 90 designates a differential coder for differential coding of the information signal, applicable to DBPSK or π/4 shift DQPSK. 91 designates a spreading portion for spreading I-channel of the information signal output from the coder 90, and 92 designates a spreading portion for spreading Q-channel of the information signal output from the coder 90. Block 93 designates a PN code generator for supplying a spreading code sequence to the coder 91 and 92.

Block 94 designates a carrier wave oscillator, 95 designates a π/2 phase shifter, 96 and 97 designates multipliers, 98 designates an adder for adding outputs from the multipliers 96 and 97. The outputs from the spreading portions 91 and 92 are quadrically modulated. When DBPSK is applied, only the I-channel is output from the coder 90.

Figure 11:
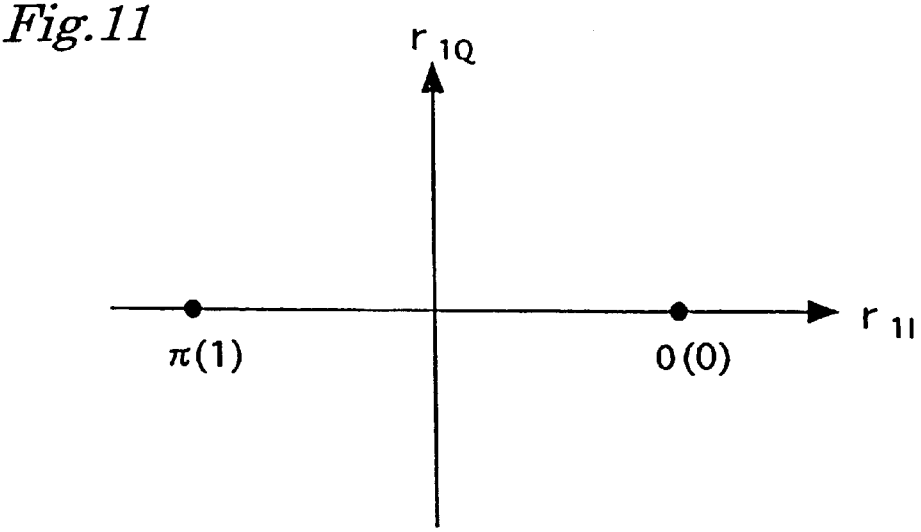
FIG. 11 is a diagram showing a provisional judgment of a signal of DBPSK modulation.

FIG. 11 shows provisional judgment of DBPSK. When I-component r1I of r1 is positive or zero, SI is judged to be "1", and when negative, SI is judged to be "0". The calculation of the formula (18) is performed.

Figure 10:
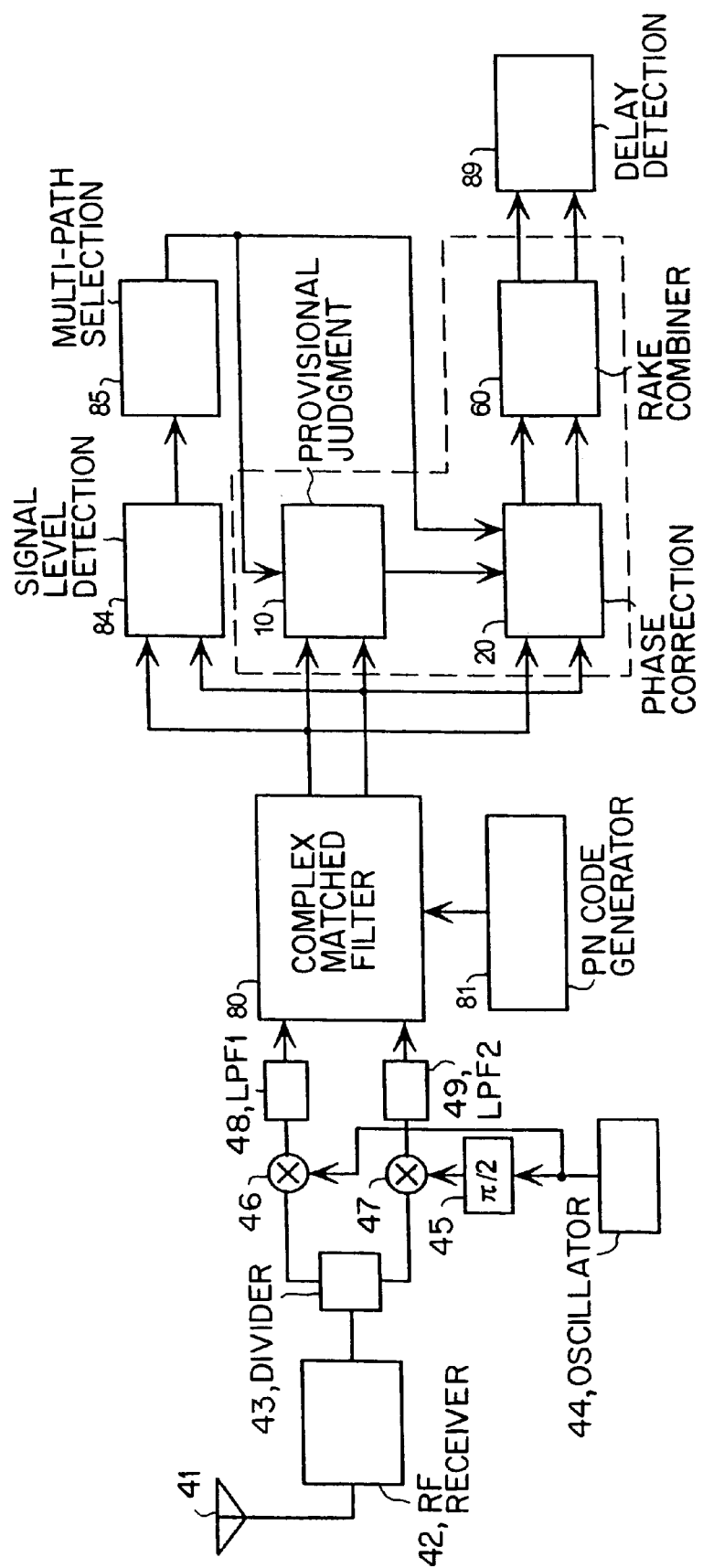
FIG. 10 is a block diagram of further another rake receiver according to the present invention applied to DS-CDMA communication method.

FIG. 10 is a block diagram of a rake receiver in which the coherent detection circuit and frame synchronization circuit are deleted. A delay detection circuit 89 is connected to an output of the complex matched filter. An output D of the circuit 89 is judged by the circuit following to the circuit 89. The information bit is judged to be "0" and "1" when the real component DI of D is more and less than zero, respectively.

Figure 12:
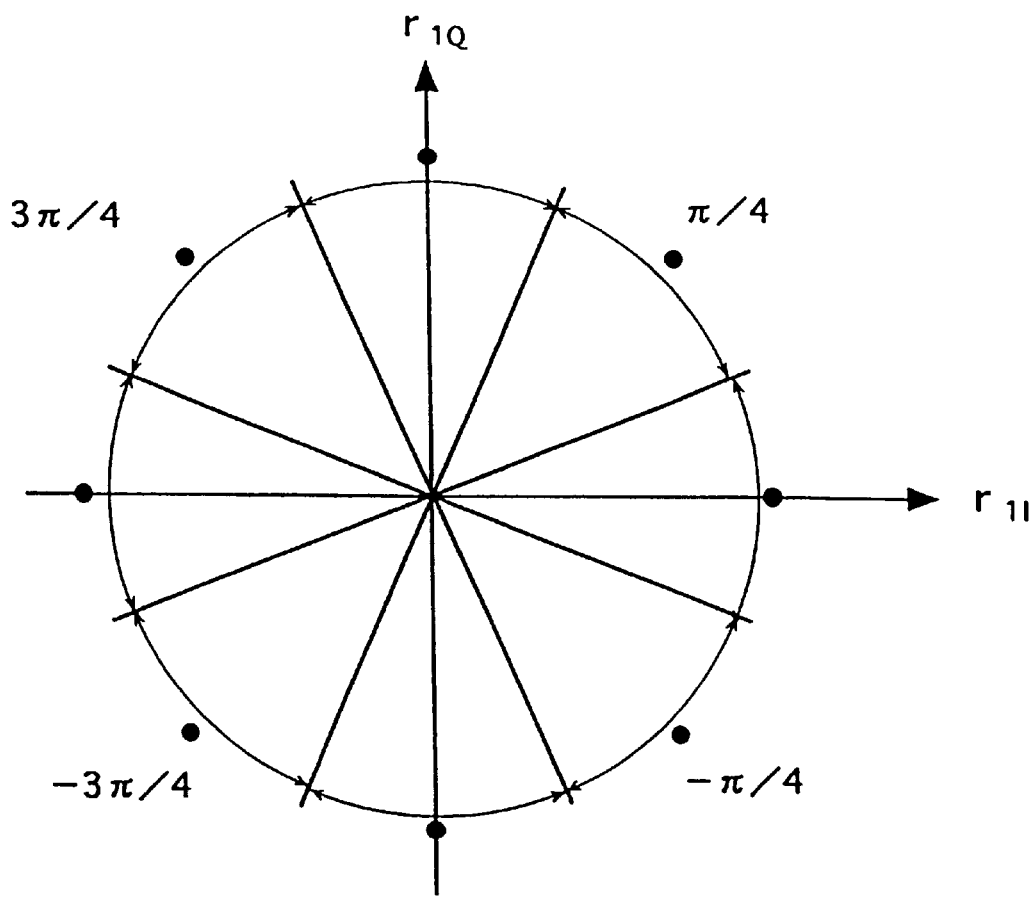
FIG. 12 is a diagram showing a provisional judgment of a signal of $\pi/4$-shift QPSK modulation.

FIG. 12 shows the provisional judgment of π/4 shift DQPSK. There are eight phases of "0", "±π/4", "±π/2, " "±3π/4" and "π". The signal r1 is judged to be of a phase φ when its phase is between ±π/8. The correction vector is calculated similarly to the above embodiments according to φ obtained as above.

Figure 13:
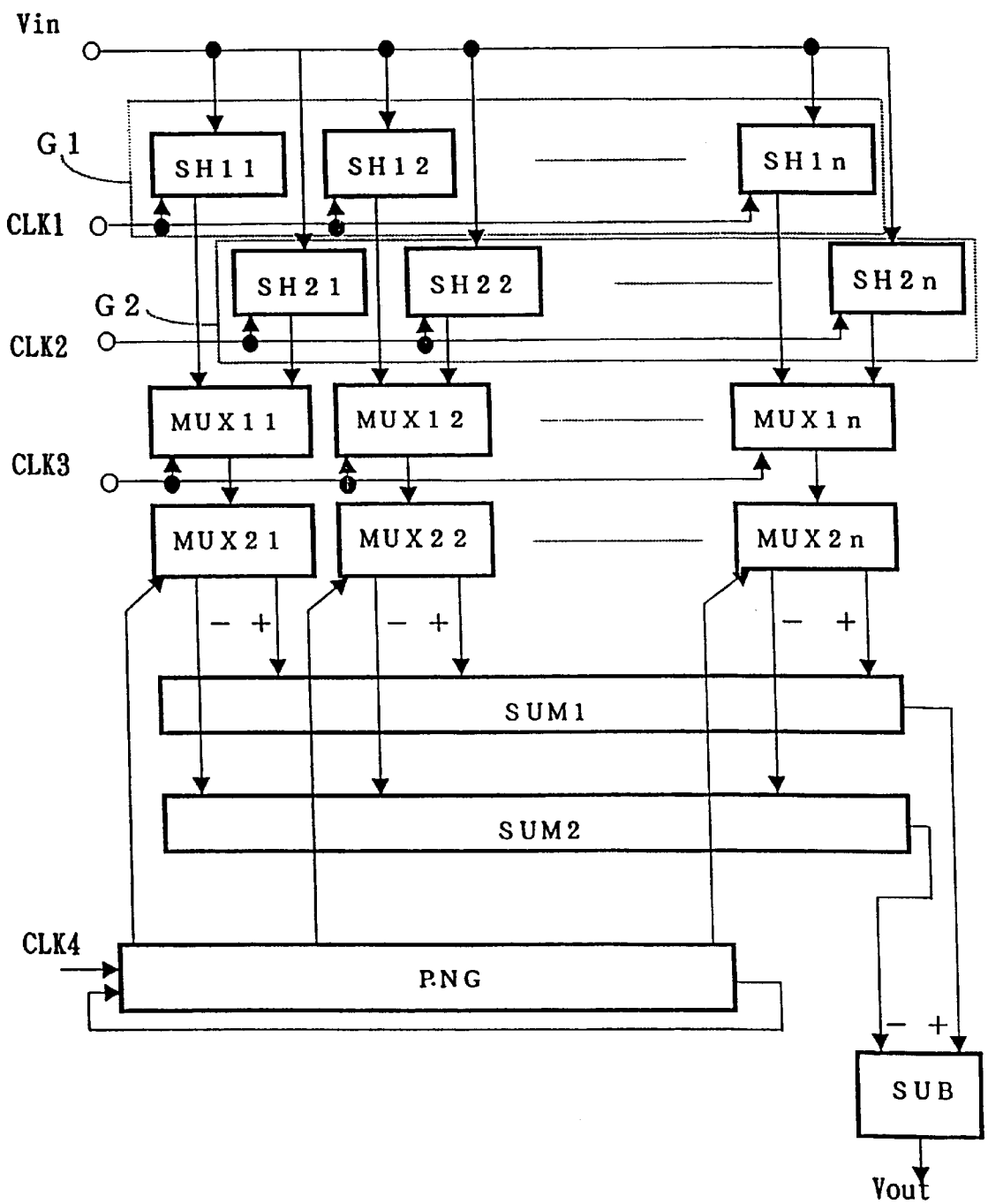
FIG. 13 is a block diagram of a first embodiment of a filter circuit according to the present invention.

FIG. 13 is a block diagram of a matched filter. There are provided the first sampling and holding circuit group G1 and the second sampling and holding circuit group G2. G1 consists of a plurality of sampling and holding circuits SH11 to SH1n and G2 consists of a plurality of sampling and holding circuits SH21 to SH2n. An analog input voltage in is parallelly input to these sampling and holding circuits SH11 to SH1n and SH21 to SH2n. The sampling and holding circuit SH1i in the first group G1 corresponds to the sampling and holding circuit SH21 in the second group G2. The groups G1 and G2 are driven by clock signals CLK1 and CLK2 so that one of the groups is used for sampling and holding Vin successively. CLK1 and CLK2 are of the same cycle of a chip time and are shifted by a half of the chip time to each other. For example, SH11 to SH1n in G1 successively take Vin, then SH21 to SH2n successively take Vin. Data is not transferred between adjacent sampling and holding circuits in order to prevent transfer error of the data.

A plurality of two-inputs-and-one-output multi-plexers MUX11 to MUX1n, corresponding to the sampling and holding circuits SH1i and SH2I, are connected at their inputs to the corresponding sampling and holding circuits SH1i and SH2i, respectively. The multi-plexer MUX1i is switched by a clock signal CLK3 so that the output is switched every half chip times from G1 to G2 or vice verse. This switching of the multi-plexers and the two groups of sampling and holding circuits enable a double sampling, that is, sampling of two sets of successive data sequence shifted by a half chip time.

A plurality of one-input/two-outputs multi-plexers MUX21 to MUX2n corresponding to MUX11 to MUX1n for receiving outputs of corresponding multi-plexers. The outputs of MUX2i corresponds to "1" (shown by "+") and "0" (shown by "−") of the i-th chip of PN code, respectively. The former outputs are connected to the first adder SUM1 and the latter outputs are connected to the second adder SUM2. The matched filter performs the calculation in the formula (23).

$$R(t) = \sum_{i=0}^{M-1} PN(i) \cdot S(t - i \cdot Tc) \tag{23}$$

The adders SUM1 and SUM2 sum the first and second outputs up, respectively, of multi-plexers MUX21 to MUX2n. The addition results are input to a subtraction circuit SUB for subtracting the total sum of the second outputs from the total sum of the first outputs. The switching of the multi-plexers MUX2i is controlled by PN code sequence stored in a PN register PNG. PNG is a shift register last stage of which is fed back to the first stage. The PN codes are shifted on every chip time so as to be shifted and circulated.

Figure 14:
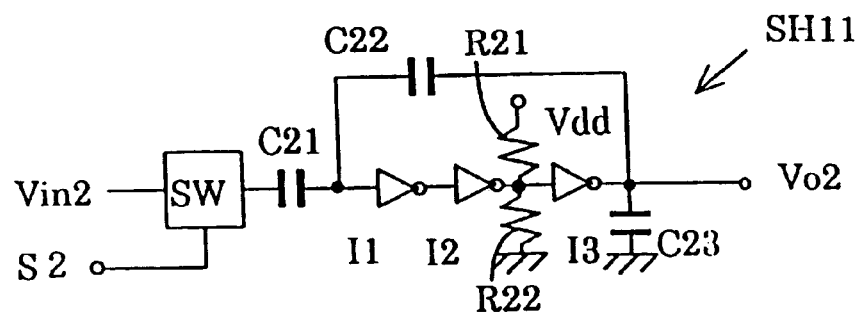
FIG. 14 is a circuit diagram of a sampling and holding circuit in the circuit of FIG. 13.

The sampling and holding circuit SH11 is shown in FIG. 14. An input voltage Vin2 is connected to a switch SW output of which is connected to a capacitance C21. Three stages MOS inverters I1 to I3 serially connected are connected to C21 at the first stage inverter I1, and an output Vo2 of the last stage inverter I3 is fed through a feedback capacitance C22 back to an input of I1. An inversion of Vin2 is generated at Vo2 with good linearity. When SW is closed, C21 is charged by an electric charge corresponding to Vin2. Then, when SW is opened, SH11 holds S(t) in the formula (23). SW is controlled by a control signal S2.

The output of the last stage inverter I3 is grounded through a grounded capacitance C23, and an output of I2 is connected through equilibrium resisters R21 and R22 to the supply voltage Vdd and the ground, respectively. Unexpected and unstable oscillation of the above circuit including the feedback loop is prevented. Since SH12 to SH1n and SH21 to SH2n are similarly, descriptions therefor are omitted.

Figure 15:
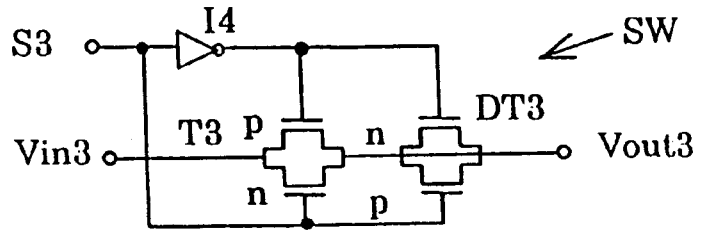
FIG. 15 is a circuit diagram of a switch in FIG. 14.

The switch SW is shown in FIG. 15. A n-type MOS transistor is connected at its source and drain to a drain and source, respectively, of a p-type MOS transistor. A transistor circuit T3 is given. An input voltage Vin3 is input to T3 at the drain of n-type MOS. T3 is connected at the source of n-type MOS through a dummy transistor DT3 to an output terminal Vout3. The control signal S3 (S2) is input to a gate of the n-type MOS, an inverted signal by an inverter I4 of S3 is input to a gate of p-type MOS. When S3 is high level, T3 is conductive, and when S3 is low level, T3 is disconnected.

Figure 16:
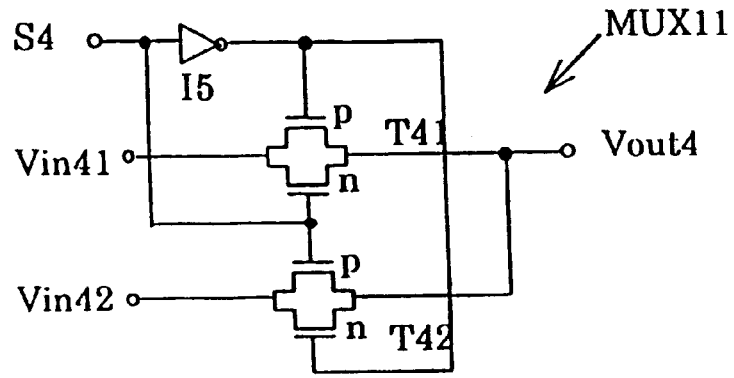
FIG. 16 is a circuit diagram of the first stage multi-plexer in FIG. 13.

The multi-plexer MUX11 is shown in FIG. 16. There are two transistor circuits T41 and T42, each of which consists of a n-type MOS transistor and a p-type MOS. The n-type MOS transistor is connected at its source and drain to drain and source of the p-type MOS transistor. The sources of the n-type MOS transistors are commonly connected an output Vout4. The output (shown by Vin41) of SH11 is input to the drain of the n-type MOS in T41, the output (shown by Vin42) of SH21 is input to the drain of the n-type MOS in T42. A signal S4 is input to the gate of n-type MOS transistor in T41 and to the gate of p-type MOS transistor in T42. An inverted signal of S4 by an inverter I5 is input to the gate of p-type MOS transistor in T41 and to the gate of n-type MOS transistor in T42. When S4 is high level, T41 is conductive and T42 is disconnected, and when S4 is low level, T41 is disconnected and T42 is conductive. Therefore, MUX11 alternatively outputs the output from SH11 or SH21 in response to S4. Since MUX12 to MUX1n are similar to MUX11, descriptions therefor are omitted.

Figure 17:
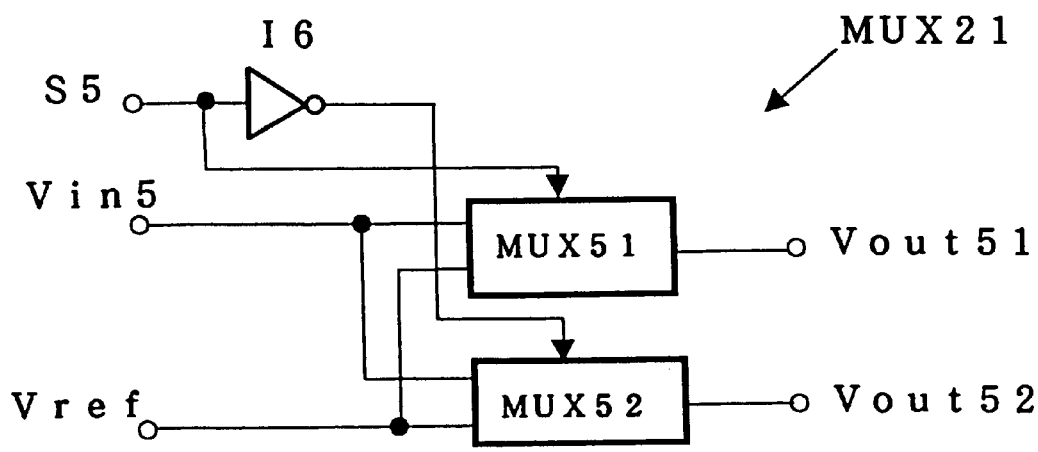
FIG. 17 is a circuit diagram of the second stage multi-plexer in FIG. 13.

In FIG. 17, the multi-plexer MUX21 consists of a pair of multiplexers MUX51 and MUX52 similar to MUX11. An output Vin51 from MUX11 and a reference voltage Vref are input to MUX51 and MUX52, respectively. A control signal S5 is input to MUX51 and an inverted signal of S5 by an inverter 16 is input to MUX52. When S5 is high level, MUX51 outputs Vin5 as an output Vout51 and MUX52 outputs Vref as an output Vout52. When S5 is low level, MUX52 outputs Vin5 as an output Vout52 and MUX51 outputs Vref as an output Vout51.

Therefore, the circuit sized is diminished to be a half of the conventional matched filter because the adders SUM1 and SUM2 are commonly used for the first and second groups. The electrical power consumption is decreased.

S(t-i●Tc) is a voltage held by the sampling and holding circuit and PN(i) is a PN code or signal S5 to be supplied to the sampling and holding circuit. When a new signal is to be held, the oldest signal is substituted by the new signal. The relationship is changed by shifting between PN(i) and each group of the sampling and holding circuits SH11 to SH1n and SH21 to SH2n. As mentioned above, the PN codes are shifted and circulated corresponding to this.

Figure 20:
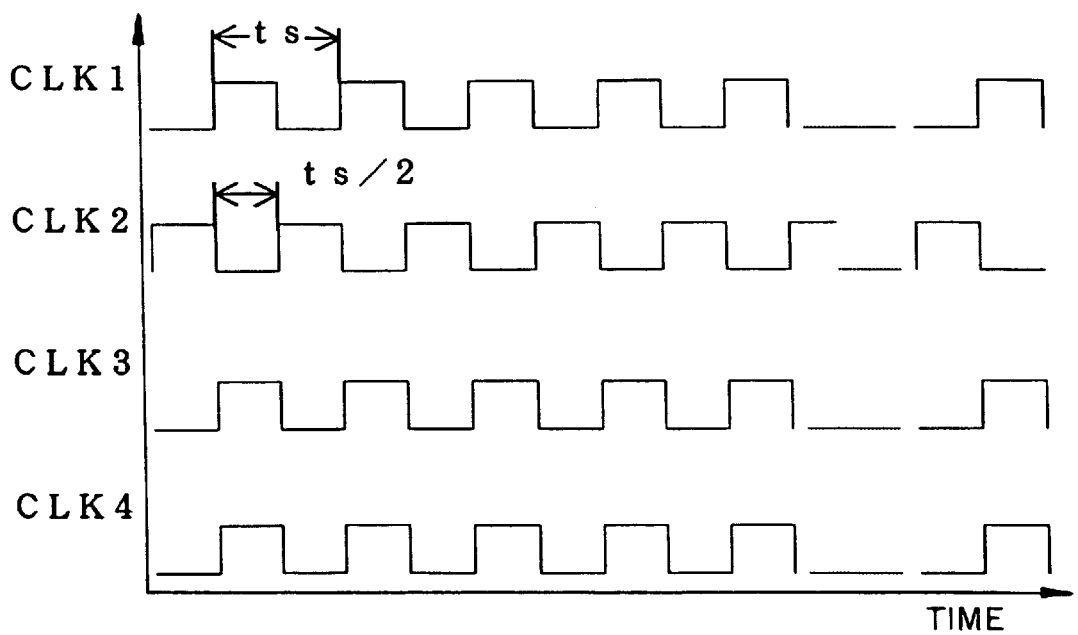
FIG. 20 is a timing chart showing relationship among CLK1 to CLK4 in FIG. 13.

FIG. 20 shows a timing of clocks CLK1 to CLK4. When a sampling cycle time is ts, CLK1 and CLK2 are shifted by ts/2. CLK3 and CLK4 are synchronous to CLK1. Here, CLK1 is expressed by a function CLK(t) of time t. CLK2 is CLK(t+ts/2) and CLK3=CLK4=CLK(t). The control speed of the PN register is rather slow in spite of the double sampling.

Figure 23:
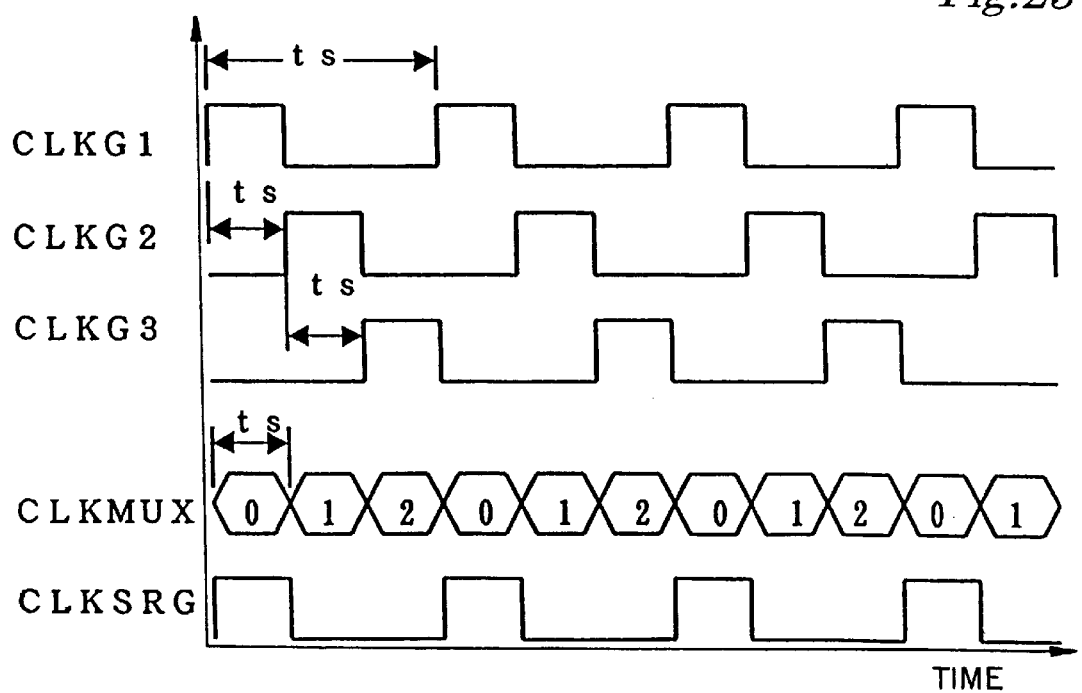
FIG. 23 is a timing chart of circuit including three groups of sampling and holding circuit.

It is possible to provide three groups of sampling and holding circuits which are alternatively selected by the first multi-plexers. When the sampling clocks of the first to third sampling and holding circuits are CLKG1, CLKG2 and CLKG3, the control signal for the first multi-plexers is CLKMUX and the control signal for the shift register is CLKSRG, the combining is obtained according to the formula (21). relationship among them is as in FIG. 23. CLKG1, CLKG2 and CLKG3 are of the same cycle ts and successively shifted by ts/3. CLKMUX is of a cycle of ts/3. CLKSRG is identical to CLKG1.

The sampling clock for ith sampling and holding circuit is expressed by CLK(t+i ts/m), when the number of the sampling and holding circuit is m, the sampling cycle is ts and the clock of the first sampling and holding circuit is CLK(t). The control signal for the first multi-plexer is used for alternatively selecting the groups in a cycle of ts/m. The control signal of the shift register is identical to one of the clocks for the sampling and holding circuit groups.

Figure 18:
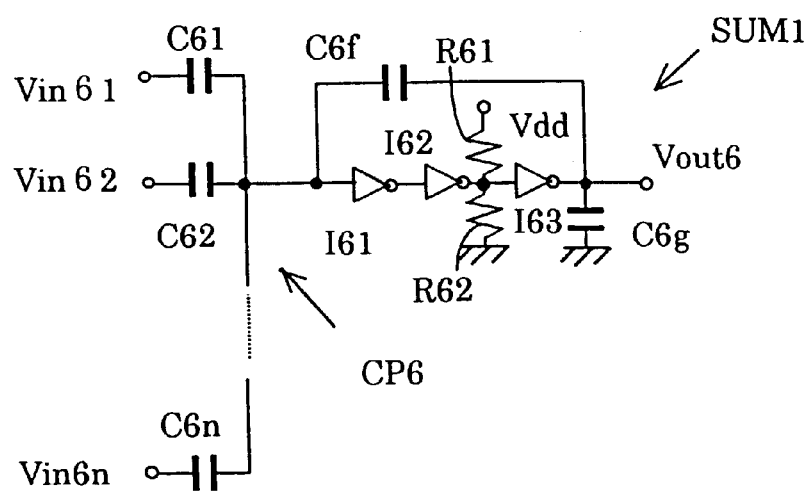
FIG. 18 is a circuit diagram of an addition circuit in FIG. 13.

The adder SUM1 is shown in FIG. 18. SUM1 consists of a plurality of capacitances C61 to C6n corresponding to MUX21 to MUX2n. The first outputs (shown by Vin61 to Vin6n) of the multi-plexers are connected to the capacitances C61 to C6n, respectively. The outputs of these capacitances are commonly connected to an inverting amplifier output of which is connected through a feedback capacitance C6f to its input. The output Vout6 of the inverter is as in the formula (24).

$$Vout6 = -\frac{\sum_{i=1}^{n} Vin6i \cdot C6i}{C6f} \qquad (24)$$

In FIG. 18, I61, I62 and I63 are MOS inverters, R61 and R62 are equilibrium resistances and C6g is a grounded capacitance. The capacitances C61 to C6n performs addition as a capacitive coupling, however, the addition can be hierarchically performed by a plurality of stages of capacitive couplings.

Figure 19:
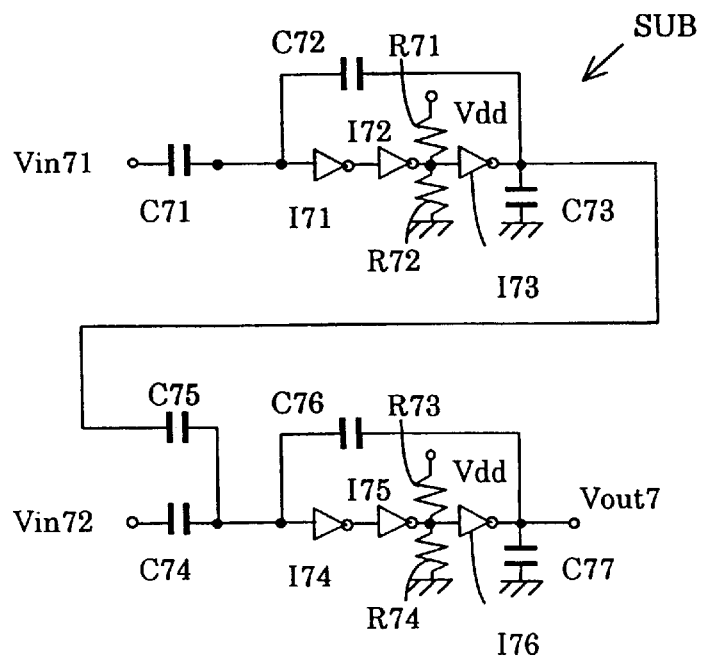
FIG. 19 is a circuit diagram of a subtraction circuit in FIG. 13.

The subtraction circuit SUB is shown in FIG. 19. SUB has a capacitance C71 connected to the output (shown by V71) of SUM1 and a capacitance C74 connected to the output (shown by V72) of SUM2. Three inverters I71 to I73 serially connected are connected to an output of the capacitance C71. An output of the last stage inverter I73 is connected through a feedback capacitance C72 to an input of the inverter I71. An inversion of the input voltage V71 is generated at the output of I73 with good linearity. The output of I73 is connected to a capacitance C75 an output of which is connected together with an output of C74 to three stages inverters I74 to I76 serially connected. An output of the last stage inverter I76 is connected through a feedback capacitance C77 to an input of the inverter I74. An inversion of an output of a capacitive coupling consisting of C74 and C75 is generated at the output of I76 with good linearity. The output Vout7 of I76v is expressed by the formula (25).

$$Vout7 = -\frac{-C75 \cdot \frac{C71}{C72} \cdot Vin71 + C74 \cdot Vin72}{C76} \qquad (25)$$

When C71=C72, C74=C75=C76, the formula (25) is simplified as in the formula (26).

$$Vout7 = Vin72 - Vin71 \qquad (26)$$

This means that a subtraction of the summations is performed. In FIG. 19, the pairs of R71 and R72, and R73 and R74 are equilibrium resistances, and C73 and C77 are grounded capacitance.

The reference voltage Vref is set to be equal to a threshold of the MOS inverters. In order to obtain a wide dynamic range in the positive and negative voltage area, the threshold is usually set to be Vdd/2. Here, Vdd is a supply voltage of the MOS inverter.

Figure 21:
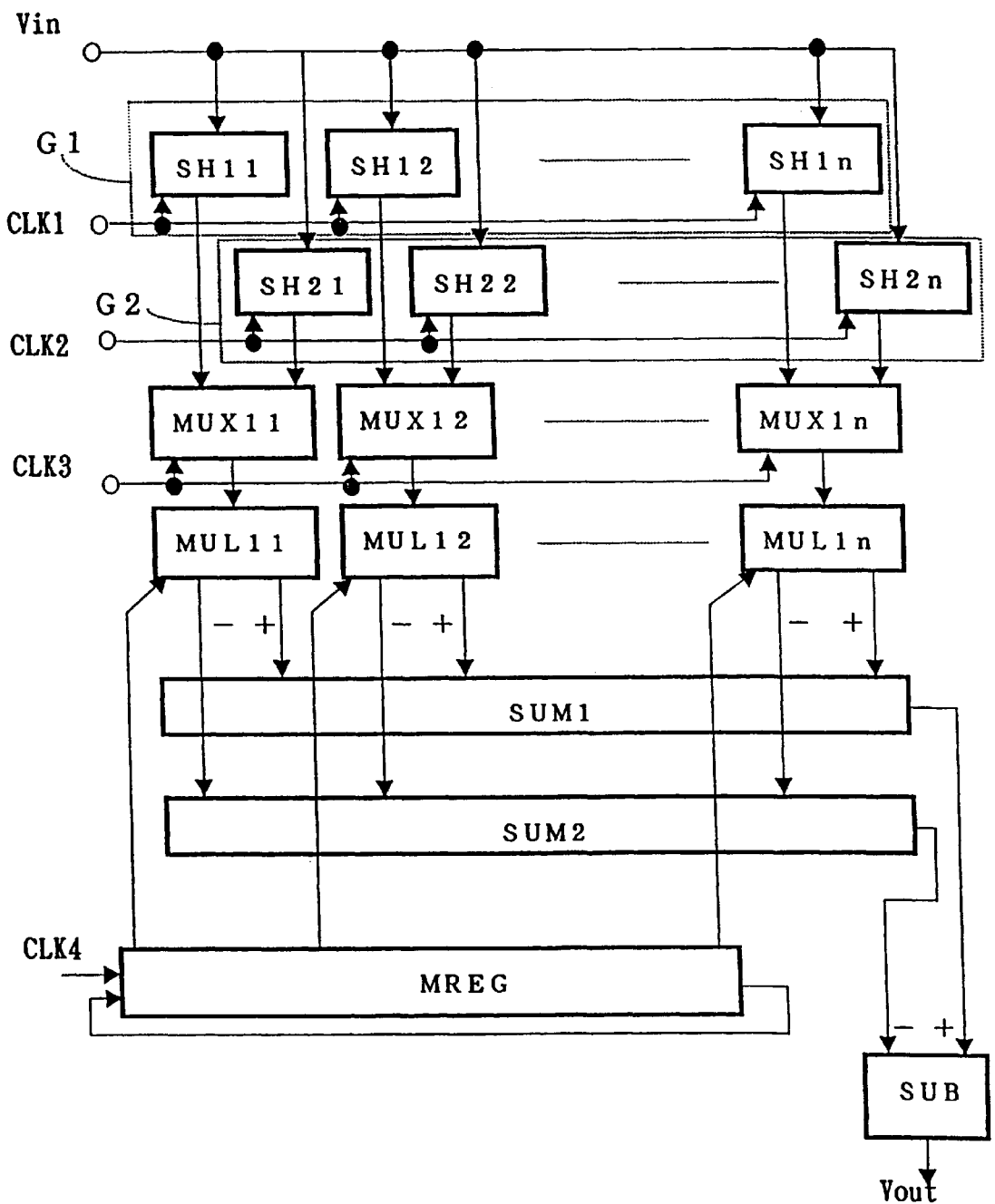
FIG. 21 is a block diagram of the second embodiment of the filter circuit.

FIG. 21 shows another filter circuit. Similar portions to those of the circuit in FIG. 13 is designated by the same references and the descriptions therefor are omitted. This filter circuit can be applied to more general usage because the multipliers are digital data of a plurality of bits. The multiplication circuits MUL11 to MUL1n are used instead of the multi-plexers MUX21 to MU2n in FIG. 13, and a multiplier register MREG is used instead of the PN register PNG.

Figure 22:
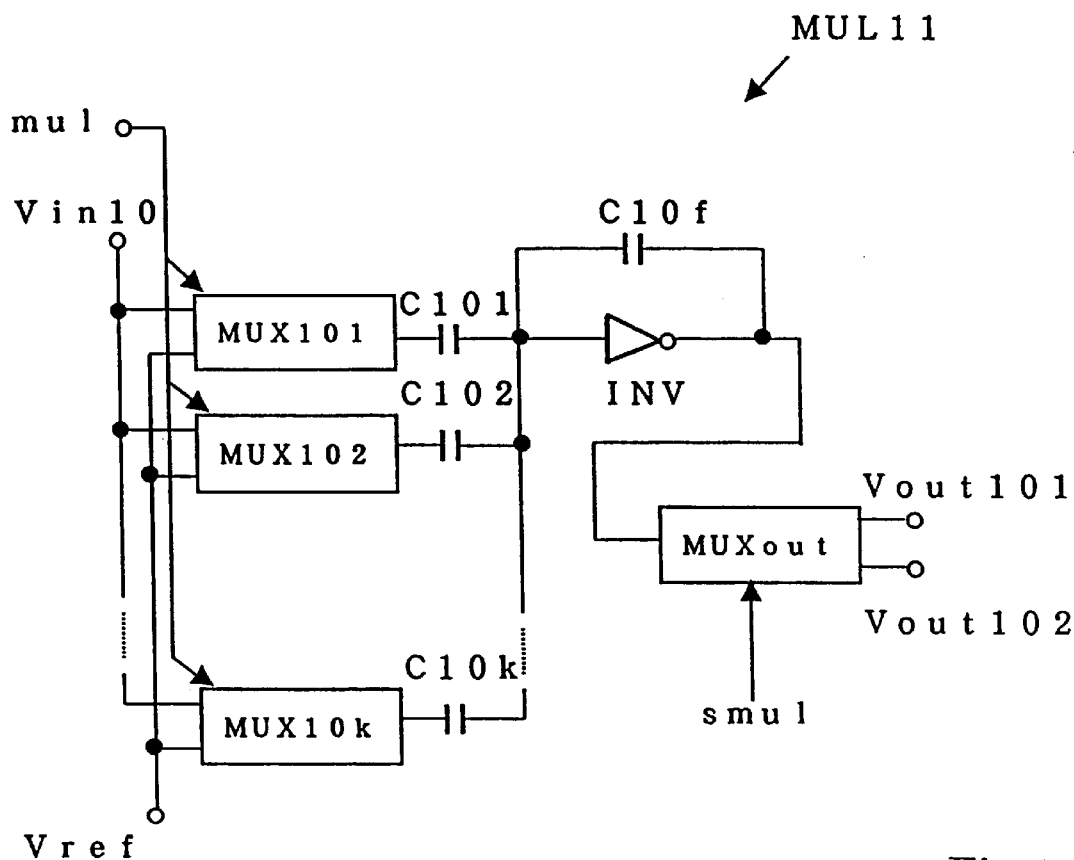
FIG. 22 is a circuit diagram of a multiplication circuit in FIG. 21.

In FIG. 22, the multiplication circuit MUL11 has k number of capacitances C101 to C10k corresponding to k bits of multipliers. These capacitances are commonly connected at their outputs to an inverter INV consisting of three stages MOS inverters. An output of INV is connected through a feedback capacitance C10f to an input of INV. Multi-plexers MUX101 to MUX10k corresponding to C101 to C10k are connected inputs of the corresponding capacitances, respectively. Each of the multi-plexers is connected at its input to an input voltage Vin10, that is, the output of the first multi-plexer and a reference voltage. C101 to C10k have capacities corresponding to $2^0$ to $2^k$ for binary weighting. When a bit of a multiplier mul is "1" the multi-plexer is connected to Vin10, when the bit is "0", it is connected to Vref. An output of the multi-plexer MUXout is connected to the output of INV, which is controlled by a sign bit smul. When smul is "0", that is, the multiplier is positive, the first output Vout101 from SUM1 is selected. When smul is "1", that is, the multiplier is negative, the second output from SUM2 is selected. Therefore, a signed multiplication is possible.

Figure 24:
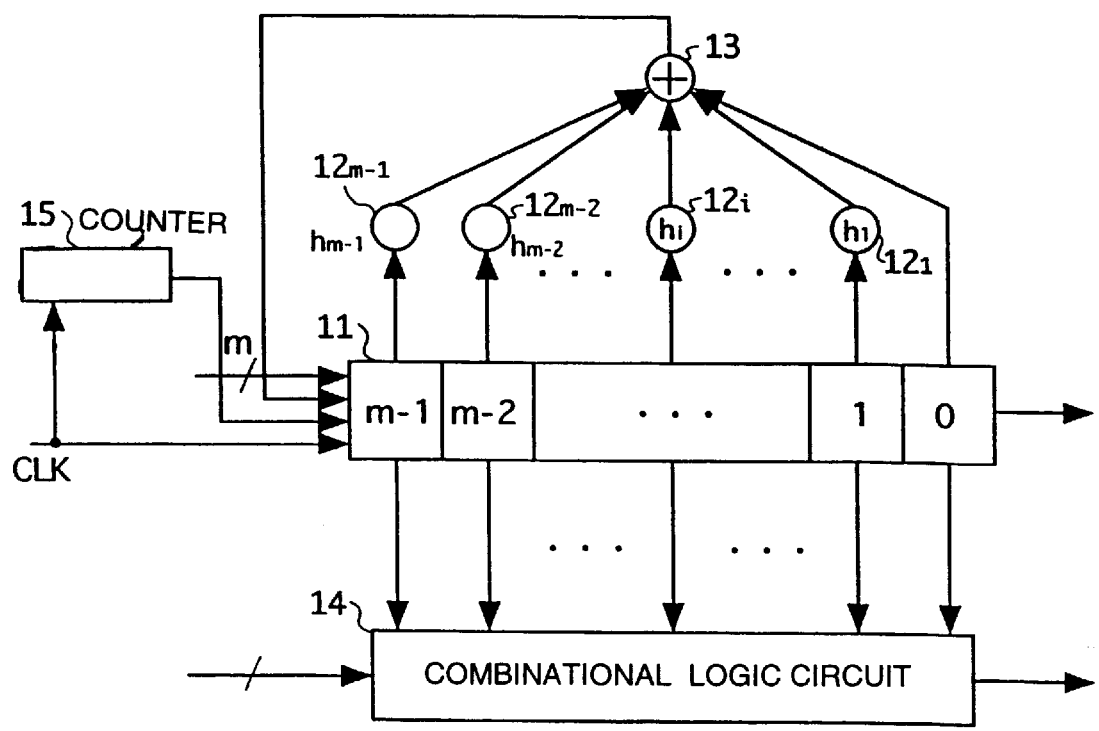
FIG. 24 is a block diagram of the first embodiment of a code generating circuit of the present invention.

FIG. 24 shows one embodiment of code generating circuit used in the DS-CDMA communication system. The code generating circuit has a shift register 11 for generating a m-sequence. However, the Gold sequence can also be generated by the same circuit.

In FIG. 24, the reference 11 designates a shift register of m stages from the $0^{th}$ to the (m−1)th. Here, m is not less than "2". The shift register has serial input and serial output as well as a parallel inputs and parallel outputs. An adder 13 modulo "2" is connected to the serial input of the shift register 11, and a clock CLK is input to a shift-clock input terminal of the shift register. A m-bits data for initializing the shift register 11 is input to the parallel inputs, which data are set to the stages of the shift register by an output of a counter 15 at the initial condition.

The references $12_1$ to $12_{m-1}$ designate multiplication circuits for multiplying data in the stages of the shift register 11 by multipliers $h_1$ to $h_{m-1}$. Each of the multipliers hi is "1" or "0" for outputting data in the corresponding stage to the adder 13 when hi is "1" and for preventing output of data when hi is "0". The adder 13 adds outputs from the multi-plication circuits $12_1$ to $12_{m-1}$ and the $0^{th}$ stage of the shift register with a modulus of "2". The output of the adder 13 is fed back to the serial input of the shift register 11. The output from the $0^{th}$ stage can be deemed as multiplied by a multiplier of "1". Here, the multiplier is defined as $h_0=1$.

A combinational logic circuit 14 is connected to the parallel outputs of the shift register 11 for addition of modulus of "2".

The counter 15 counts CLK for initializing the data in the shift register 11 when a counted value reaches a predetermined value. The initial data is set also by a control signal generated by the counter 15. A m-sequence of a cycle of $2^m-1$ is generated by the shift register of m stages, circuits $12_1$ to $12_{m-1}$ and the adder 13 according to the formula (27). The code is output from the serial output of the $0^{th}$ stage.

$$h(X)=X^m+h_{m-1}X^{m-1}+\ldots+h_1X+1 \tag{27}$$

The m-sequence can be set in its phase by adjusting the initial condition of the shift register 11.

The m-sequence is a characteristics that an addition modulo "2" of a code sequence and a sequence shifted with circulation of the former sequence becomes another sequence shifted with circulation of the sequence. It is called "shift additive characteristics".

When a shifted sequence is necessary by m bits from a sequence in the shift register 11, necessary bits are selected in the shift register 11 and are calculated according to the additional modulo "2". The logic circuit 14 selects the necessary data from the parallel output of the shift register 11 according to the control signal. The shifted code sequence can be output as soon as a m-sequence is output without delay. A plurality of shifted sequences can be output when a plurality of combinational logic circuits are provided.

When partial sequence is used in a receiver of CDMA system, the shift register 11 is repeatedly initialized on counting an intermediate number of stages of the shift register.

Figures 25A, 25B:
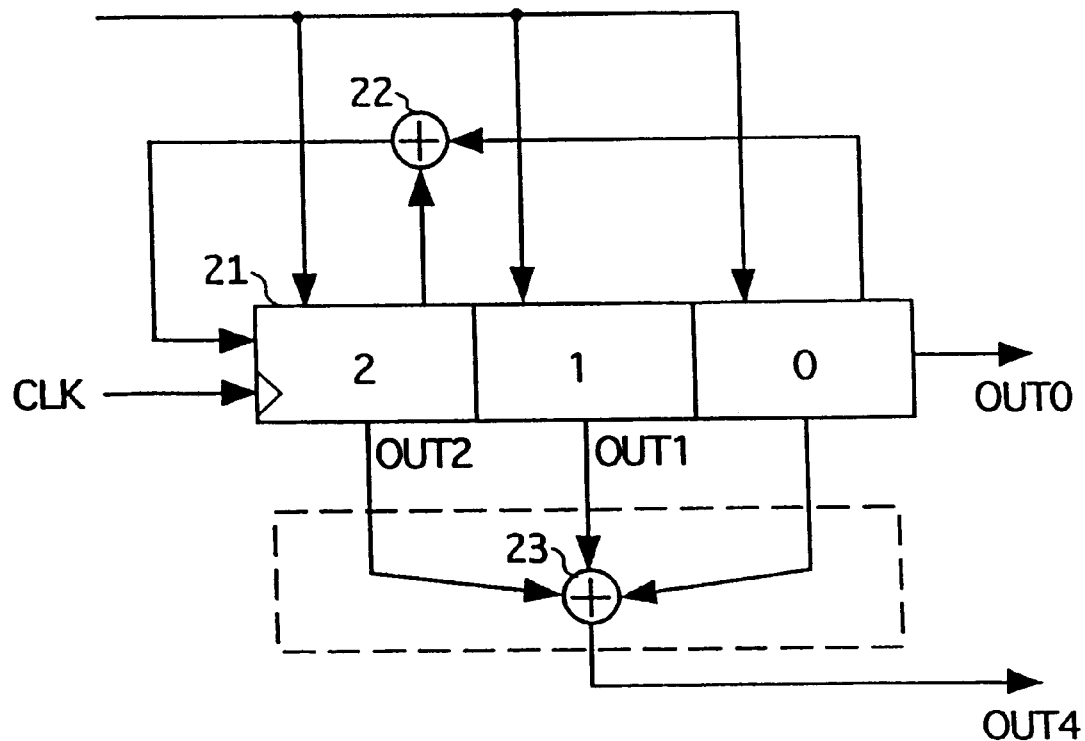
FIG. 25A is a block diagram of M-sequence code generating circuit including the code generating circuit according to the present invention.
FIG. 25B is a table showing the four outputs through eleven timing pulses.

FIG. 25A shows a simple circuit for code generation. There are three stages in the shift register and a m-sequence of a cycle of 7 bits. A sequence shifted by 4 bits is simultaneously generated.

In FIG. 25(A), the reference 21 designates a shift register with three stages. 22 designates an adder modulo "2" for adding the $0^{th}$ and the second stages with modulus "2" and for inputting the addition result to the data input of the shift register. This calculation is equivalent to an exclusive-or calculation. An initializing data is input to the parallel input of the shift register at the initial condition. The m-sequences generated according to the primitive polynomial (28) in response to CLK impressed to the shift clock input terminal is output from the $0^{th}$ stage output OUT0.

$$h(X)=X^3+X^2+1 \tag{28}$$

The reference 23 designates an adder modulo "2" for adding outputs OUT0, OUT1 and OUT2 of the $0^{th}$, the first and the second stages. The adder is equivalent to the circuit 14 in FIG. 24. An output of the adder is expressed by the formula (29).

$$OUT=OUT2 \oplus OUT1 \oplus OUT0 \tag{29}$$

OUT4 is a shifted sequence by 4 bits of OUT0.

FIG. 25(B) is a table showing outputs from the stages. At the initial condition of time "0", (1,1,0) are set in the $0^{th}$ to the second stages by the initializing data. The output OUT4 of the adder 23 is "0" and the output the adder 22 is "1". When one pulse of the shift clock CLK is input at the time "1", the data are shifted by one stage and the output of the adder 22 is input to the second stage. The other outputs are generated similarly to the above as shown in the table. The m-sequence of a cycle of "7" is output from OUT0, a sequence shifted by 1 bit from the sequence of OUT0 is output from OUT1 and a sequence shifted by 2 bit from the sequence of OUT0 is output from OUT2. The output OUT4 from the adder 23 is a sequence shifted by 4 bits of OUT0. Therefore, the original sequence and shifted sequences are simultaneously output without delay.

Figure 26:
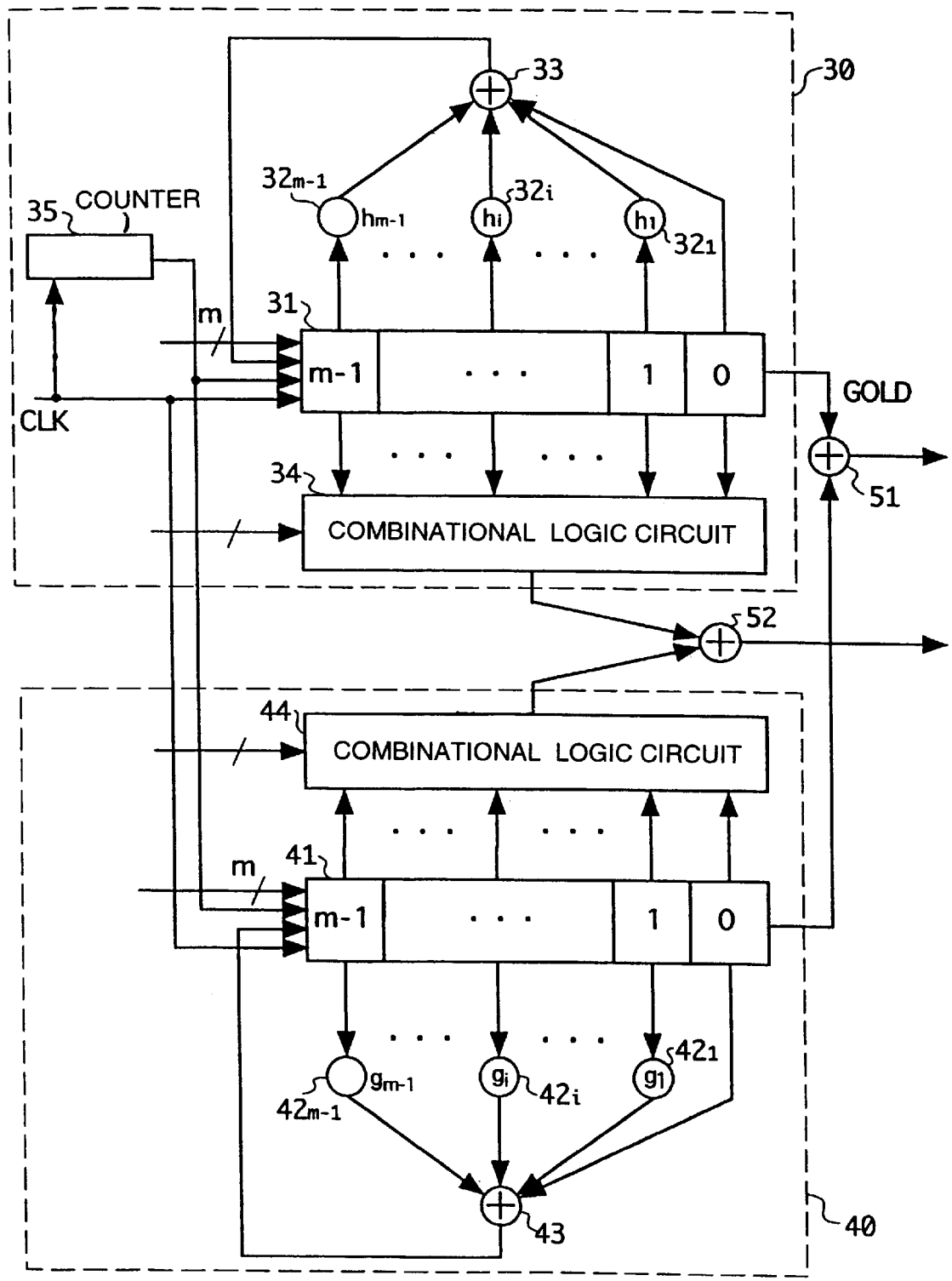
FIG. 26 is a block diagram of another embodiment of a code generating circuit.

FIG. 26 shows the second embodiment of the code generator having two circuits of FIG. 24 for generating a Gold sequence by adding two m-sequences.

In FIG. 26, references 30 and 40 designate the first and second m-sequence generating circuits similar to the circuit in FIG. 24. In the circuit 30, 31 designates m-stages shift register, $32_1$ to $32_{m-1}$ are multiplication circuits, 33 designates adder modulo "2" for adding outputs from $32_1$ to $32_{m-1}$. 34 designates a combinational logic circuit and 35 designates a counter for counting the shift clock. In the circuit 40, 41 designates m-stages shift register, $42_1$ to $42_{m-1}$ are multiplication circuits, 43 designates adder modulo "2" for adding outputs from $42_1$ to $42_{m-1}$. 44 designates a combinational logic circuit. The circuits 30 and 40 work similarly to the circuit in FIG. 24.

The first m-sequence is output from the circuit 30 according to the primitive formula (30), and a shifted sequence by necessary bits of the first sequence is output from the circuit 34. The second m-sequence is output from the circuit 40 according to the primitive formula (31), and a shifted sequence by necessary bits of the second sequence is output from the circuit 44.

$$h(X) = X^m + h_{m-1}X^{m-1} + \ldots + h_1X + 1 \qquad (30)$$

$$g(X) = X^m + g_{m-1}X^{m-1} + \ldots + g_1X + 1 \qquad (31)$$

The reference 51 designates an adder modulo "2" for bit addition of the first m-sequence without shift output from the shift register 31 and the second m-sequence without shift output from the shift register 41. A Gold sequence without shift is output from the adder 51.

The reference 52 designates an adder modulo "2" for bit addition of the first m-sequence with a predetermined shift output from the logic circuit 34 and the second m-sequence with predetermined shift output from the logic circuit 44. A Gold sequence with predetermined shift is output from the adder 52.

The m-sequence without shift and the sequence with a predetermined shift are simultaneously output from the shift register 31 and the logic circuit 34, respectively. The m-sequence without shift and the sequence with a predetermined shift are simultaneously output from the shift register 41 and the logic circuit 44, respectively. The Gold sequence without shift and with predetermined shift are output from the adders 51 and 52, respectively. The shift is determined by the control signal input to the logic circuit 34 and 44.

The shift register 31 and 41 can be simultaneously initialized by an output of the counter, a partial sequence of the Gold sequence and a shifted sequence thereof can be repeatedly generated.

Figure 27:
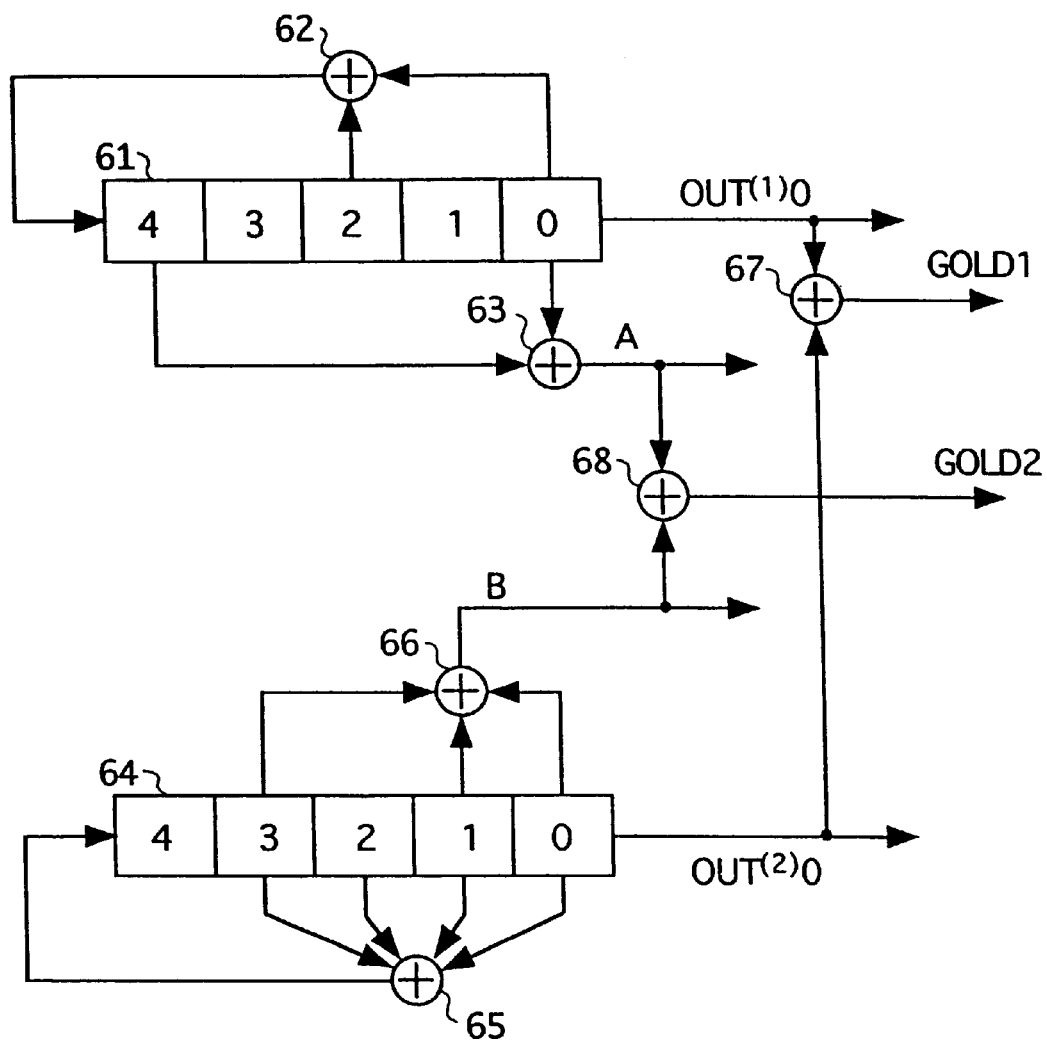
FIG. 27 is a block diagram of Gold sequence generating circuit including the code generating circuit in FIG. 24.

FIG. 27 shows a simple circuit for generating Gold sequence. In FIG. 27, the reference 61 designates a shift register with five stages. 62 designates an adder modulo "2" for adding the $0^{th}$ and the second stages with modulus "2" and for feeding the addition result to the fourth stage of the shift register. 63 designates an adder modulo "2" for adding the $0^{th}$ and the fourth stages with modulus "2". The m-sequences is generated according to the primitive polynomial (32).

$$h_1(X) = X^5 + X^2 + 1 \qquad (32)$$

The reference 64 designates a shift register with five stages. 65 designates an adder modulo "2" for adding the $0^{th}$, the second and the third stages with modulus "2" and for feeding the addition result to the fourth stage of the shift register. 66 designates an adder modulo "2" for adding the $0^{th}$, the first and the third stages with modulus "2". The m-sequences is generated according to the primitive polynomial (33).

$$h_1(X) = X^5 + X^3 + X^2 + X + 1 \qquad (33)$$

The reference 67 designates an adder modulo "2" for adding the first m-sequence without shift output from the shift register 61 at every clock timing. A Gold sequence without shift is output from the adder 67.

The reference 68 designates an adder modulo "2" for addition of the first m-sequence A with shift output from the adder 63 on every clocks. A Gold sequence Gold2 with a predetermined shift is output from the adder 68.

FIG. 28 is a table showing outputs of Gold sequences for each clock timing. At the initial condition of time "0", (1,1,1,1,1) are set in the $0^{th}$ to the fourth stages in the shift registers 61 and 64. When one pulse of the shift clock CLK is input, the data are shifted by one stage and the first m-sequence (OUT$^{(1)}$0) of 31(=$2^5$–1)bits cycle is output from the $0^{th}$ stage of the shift register 61. Shifted m-sequences by one to four are output from the first to fourth stages. The adder 63 outputs a shifted sequence by 10 bits from OUT$^{(1)}$0.

The second m-sequence (OUT$^{(2)}$0) of a cycle of 31 bits is output from the $0^{th}$ stage of the shift register 64. Sequence successively shifted are output from other stages. A shifted sequence B by 10 bits of OUT$^{(2)}$0 is output from the adder 66.

The adder 66 for adding A of the first sequence and B of the second sequence outputs a Gold sequence GOLD1. GOLD2 is shifted by 10 bits from GOLD1.

Therefore, the Gold sequence without shift and with a necessary shift are simultaneously output without delay.

Any of the m-sequences and the Gold sequences can be generated by changing the initial data. The code-shifting can be adjusted by changing the tap position of the shift registers 61 and 64 for outputting data to the adder 63 and 64.

Figure 29:
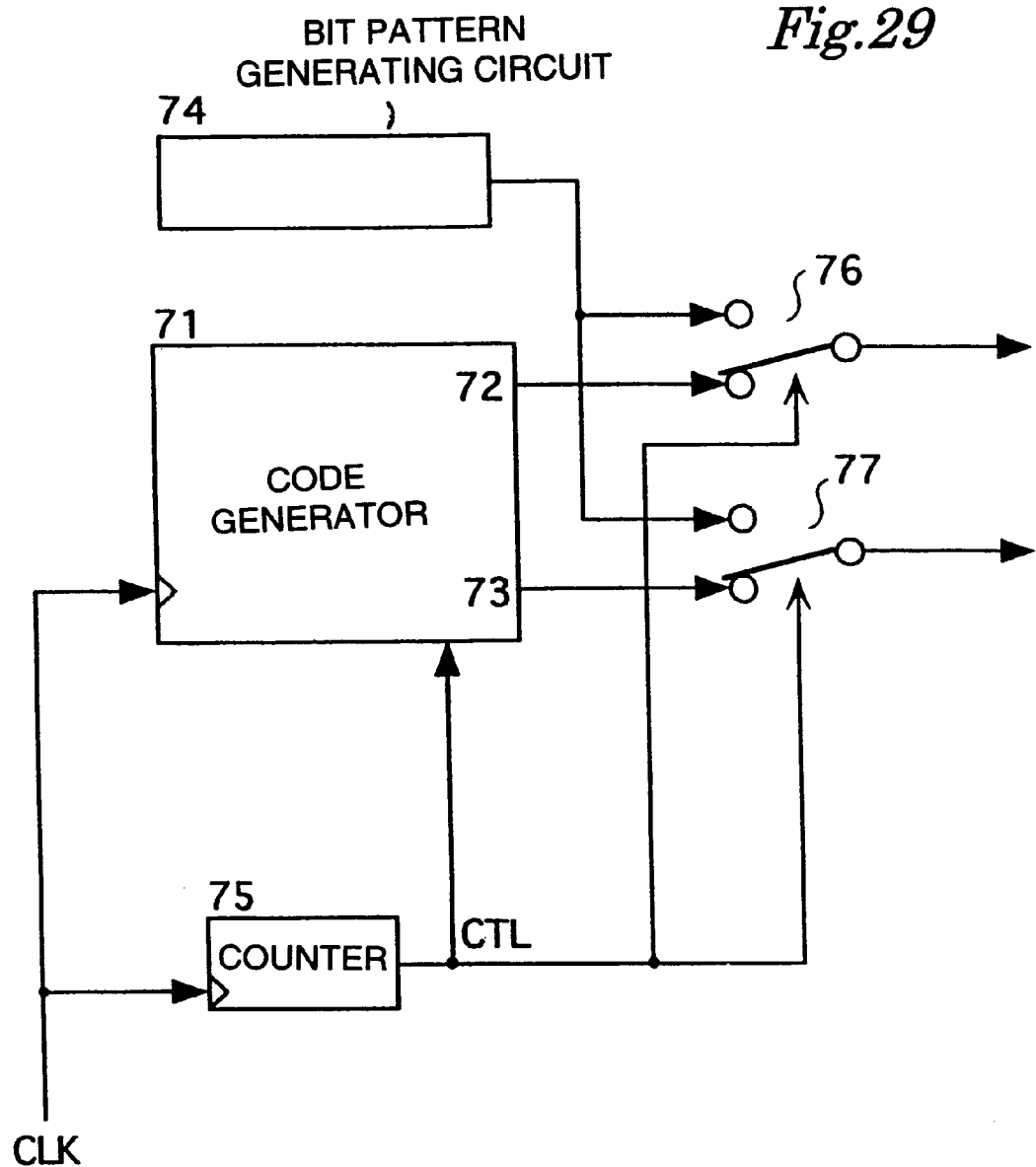
FIG. 29 shows another embodiment for inserting a bit pattern in a code sequence.
Figure 30:
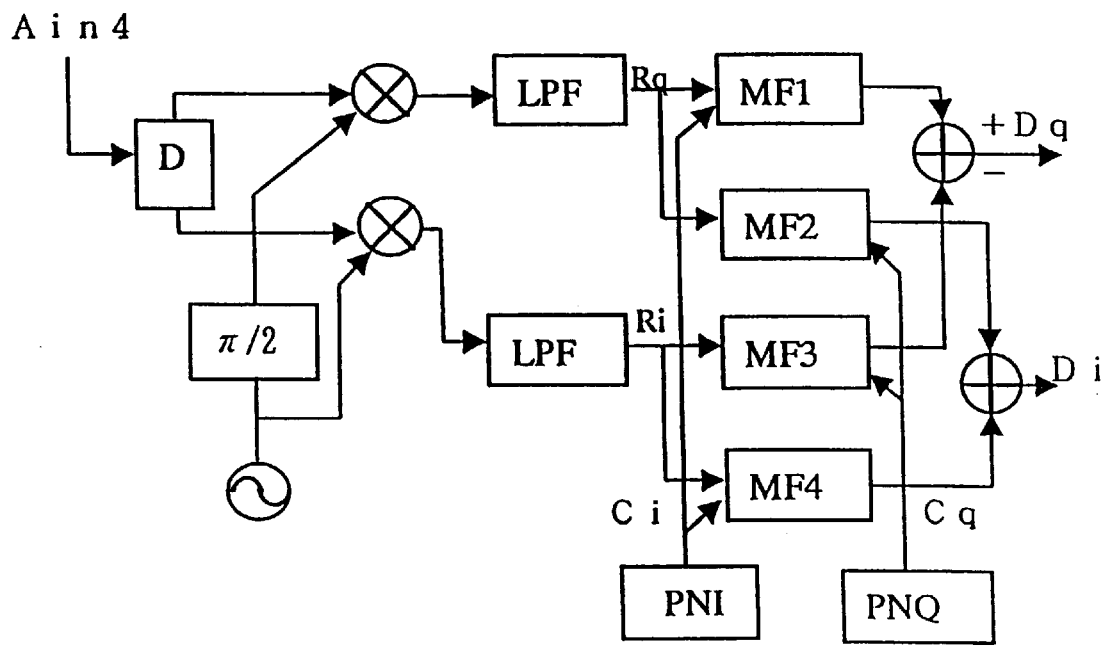
FIG. 30 is a block diagram of a conventional receiver using a matched filter.
Figure 31:
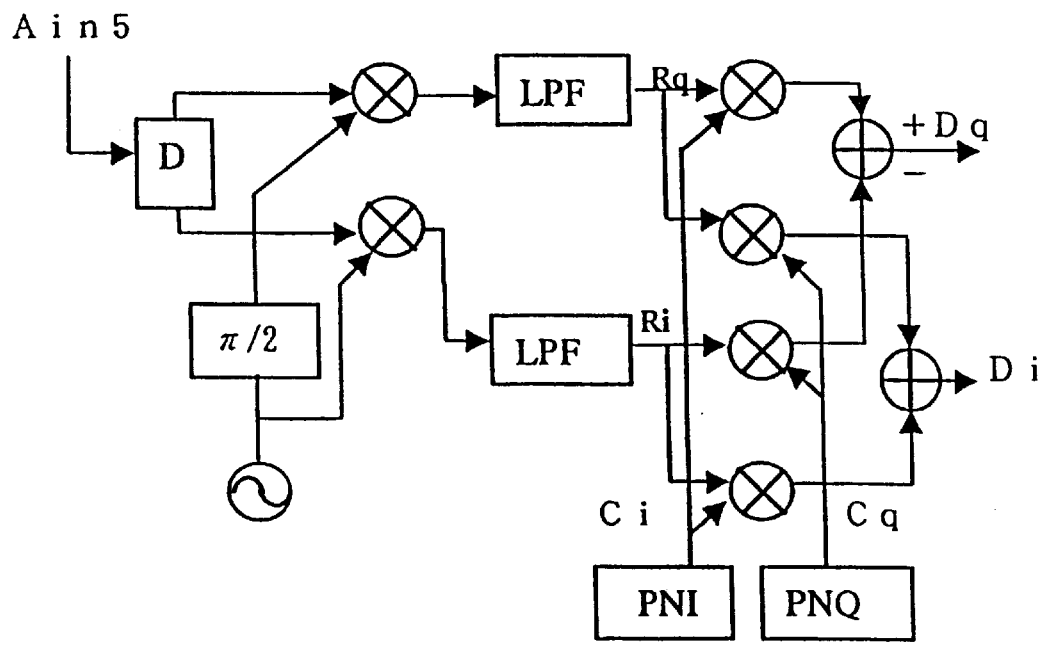
FIG. 31 is a block diagram of a conventional receiver using a sliding correlator.
Figure 32A:
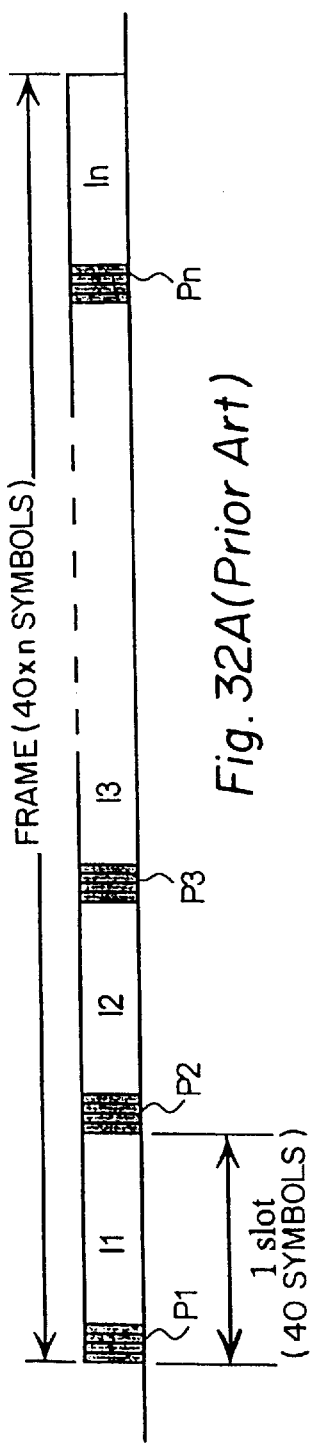
FIG. 32A shows the frame format for DS-CDMA data transmission.
Figure 32B:
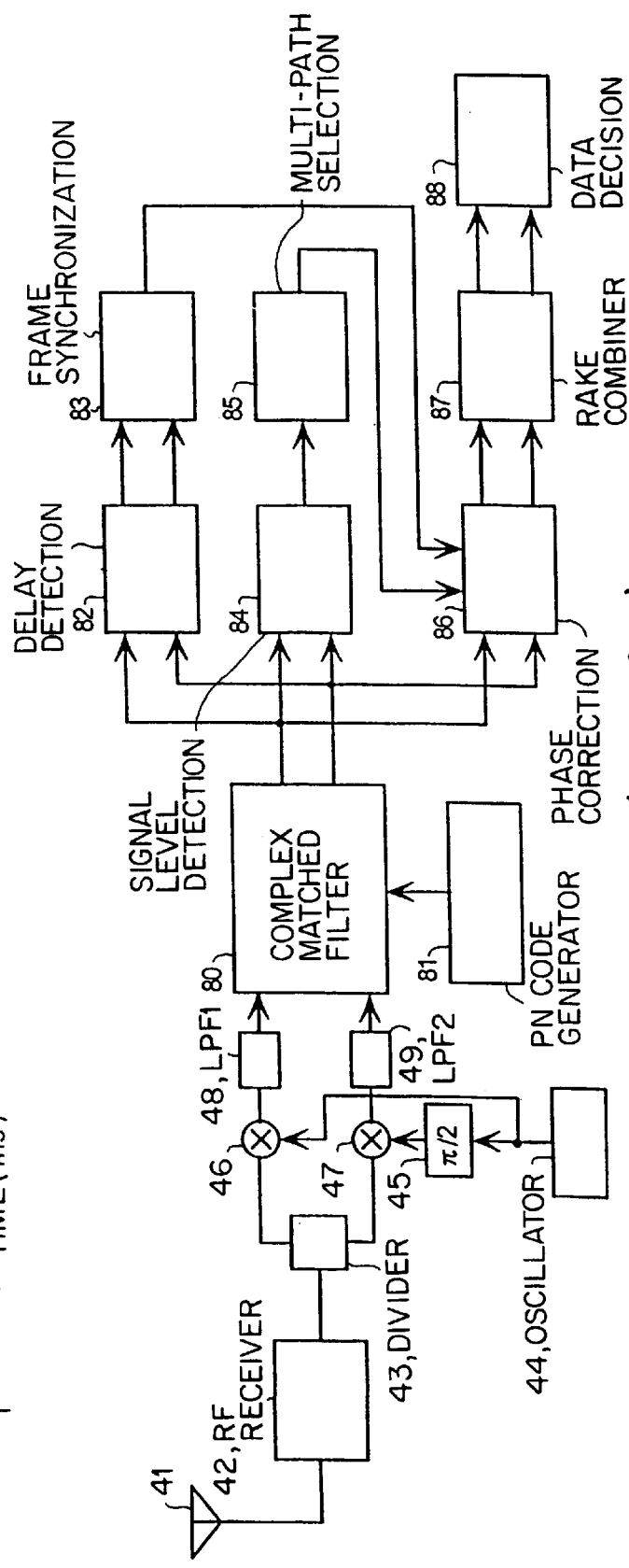
FIG. 32B shows a conventional rake receiver.

FIG. 29 is a circuit for inserting a bit pattern into a Gold sequence.

In FIG. 29, 71 designates a code generator of m-sequence generating circuit or Gold sequence generating circuit. Terminal 72 designates an output terminal of the circuit 71, and 73 designates an output terminal of the shifted sequence. Terminal 74 designates a bit pattern generating circuit for generating a bit pattern of any bits. Block 75 designates a counter for counting the shift clock CLK. The counter 75 may be similar to the counter 15 or 35. The counter 75 changes the control signal CTL to be a predetermined level (for example, high level) when the counter counts the number for inserting the bit pattern, and return CTL to the other level (for example, low level) when the total time has passed corresponding to the bit pattern.

The control signal CTL of the counter 75 is input to a code generating circuit 71. The shift register is stopped in its shifting when CTL is for example high level. The switch 76 and 77 select the output terminals 72 and 73 when CTL is for example low level and select the output of the bit pattern 74 when CTL is for example high level.

The scope of the invention should be determined by the appended claims and their legal equivalents, rather than by the examples given.

What is claimed is:

1. A spread spectrum communication system comprising:
   a transmitter comprising a data modulation circuit which modulates data to be transmitted and generates an in-phase component (I-component) and a quadrature component (Q-component) of said data and a spreading circuit which spreads said I- and Q-components by spreading code sequences to produce spread data;
   a receiver for receiving a multi-path signal of said spread data including a plurality of signals of different phases, said receiver comprising:
      a quadric detection circuit which divides said plurality of signals into I- and Q-components;
      a despreading circuit which despreads said I- and Q-components so as to generate despreaded components;
      a phase correction circuit which corrects the phase of said despreaded components;
      a rake combiner for combining said components corrected by said phase correction circuit and for outputting a combined signal; and a delay detection circuit which delays detection of said combined signal, said receiver further comprising a provisional judgment portion for determining said phase of one pair of said I- and Q-components, and said phase correction circuit correcting said phase according to said determined phase.

2. A spread spectrum communication system as claimed in claim 1, said phase correction circuit comprising:

a correction vector calculation circuit which calculates a correction vector from multiplication of said despreaded signal by a complex conjugate of said determined phase;

a memory for holding said despreaded signals for a time necessary for the calculation of said correction vector calculation circuit; and a multiplier which multiplies an output of said memory by a complex conjugate vector of said correction vector.

3. A spread spectrum communication system as claimed in claim 1, further comprising a coherent detector.

4. A spread spectrum communication system as claimed in claim 1, wherein said data modulation circuit performs modulation by differential modulation.

5. A spread spectrum communication system as claimed in claim 1, wherein said despreading circuit generates combined data by combining said I- and Q-components, multiplies said combined data by a signal obtained by addition and by a signal obtained by subtraction of said spreading code sequences for said I- and Q-components.

6. A spread spectrum communication system as claimed in claim 1, wherein said despreading circuit comprises:

a plurality of groups of sampling and holding circuits, each group having corresponding sampling and holding circuits connected to an analog input voltage, each of said groups of sampling and holding circuits successively and circulatingly holding said analog input voltage;

a plurality of first multiplexers corresponding to each of said groups of sampling and holding circuits, said plurality of first multiplexers connected in parallel to corresponding sampling and holding circuits of all of said groups for selectively outputting outputs from said sampling and holding circuits of one of said groups;

a plurality of multipliers corresponding to said first multiplexers, each having a first output for a positive output and a second output for a negative output;

a shift register for storing multipliers for said plurality of multipliers;

a first adder for summing said first outputs;

a second adder for summing said second outputs; and a subtracter for subtracting an output of said second adder from an output of said first adder.

7. A code generating circuit of claim 1, used for said spread spectrum communication system, comprising:

a shift register for holding data driven by a shift clock;

an adder for performing modulo-2 addition of a plurality of stages of said shift register and for outputting an addition result to a first stage of said shift register; and a combinational logic circuit for modulo-2 adding data of a plurality of stages in said shift register for generating shifted data from said data in said shift register.

8. A receiver for a spread spectrum communication system comprising a matched filter, said matched filter comprising:

a quadrature detection means for demodulating a received signal to baseband I-and Q-components;

a low-pass filter for removing a high order harmonic carrier wave from the output of said detection means;

a first adder for adding said I-and Q-components output from said low-pass filters;

a plurality of sampling and holding circuits for holding successive outputs from said adder;

a plurality of first multipliers for multiplying said outputs in said sampling and holding circuits by said spreading code sequence for I-components;

a plurality of second multipliers for multiplying said outputs in said sampling and holding circuits by said spreading code sequence for Q-components;

a second adder for summing total outputs up from said first multipliers; a third adder for summing total outputs up from said second multipliers;

a fourth adder for adding outputs from said second and third adder; and a subtracter for calculating difference between outputs from said second and third adder.

9. A receiver for a spread spectrum communication system as claimed in claim 8, wherein said sampling and holding circuits are serially connected from a first to a last stage so as to transfer data from said first stage to said last stage, said outputs from said first adder are input to said first stage, and said first and second multipliers are connected to corresponding sampling and holding circuits respectively.

10. A receiver for a spread spectrum communication system as claimed in claim 8, wherein said output from said first adder is connected to said sampling and holding circuits, said first and second multipliers are connected to corresponding sampling and holding circuits, and said spreading code sequences for I- and Q-components supplied to said first and second multipliers are shifted with respect to relationship with said first and second multipliers.

11. A receiver for a spread spectrum communication system as claimed in claim 8, further comprising sliding correlators for data demodulation, said matched filter being used for acquisition.

12. A receiver for a spread spectrum communication system as claimed in claim 11, wherein said sliding correlators are used to despread by using a long code and a short code, and said matched filter is used to despread by said short code for synchronization of said long code.

13. A filter circuit comprising:

a plurality of groups of sampling and holding circuits, each group having corresponding sampling and holding circuits connected to an analog input voltage, each of said groups of sampling and holding circuits successively and circulatingly holding said analog input voltage;

a plurality of first multiplexers corresponding to each of said groups of sampling and holding circuits, said plurality of multiplexers connected in parallel to corresponding sampling and holding circuits of all of said groups for selectively outputting outputs from said sampling and holding circuits of one of said groups;

a plurality of multipliers corresponding to said first multiplexers each having a first output for a positive output an a second output for a negative output;

a shift register for storing multipliers for said plurality of multipliers;

a first adder for summing said first outputs;

a second adder for summing said second outputs; and a subtracter for subtracting an output of said second adder from an output of said first adder.

14. A filter circuit as claimed in claim 13, wherein said multipliers comprise a plurality of second multiplexers having first and second outputs, said plurality of second multiplexers being switched in response to a spreading code sequence.

15. A filter circuit as claimed in claim 13, wherein said sampling and holding circuits of an ith group are controlled by a clock, $$CLK\left(t + i \cdot \frac{ts}{m}\right)$$

where t: time (=0, 1, 2, . . . m−1),

CLK(t): control clock of said ith group, i: number of said sampling and holding circuits, m: total number of groups of sampling and holding circuits, and ts: sampling cycle.

16. A code generating circuit comprising:

first and second code generating circuits, each of said first and second code generating circuits comprising:

a shift resister which holds data driven by a shift clock, a first adder for performing modulo-2 addition of a plurality of stages of said shift resister and for outputting a result to a first stage of said shift resister, a combinational logic circuit for performing modulo-2 addition of data from a plurality of stages in said shift register for generating shifted data from said data in said shift register, a bit-pattern generator for generating a predetermined bit-pattern, a counter for counting said shift clock, and a controller adapted to stop shifting of said shift register as well as outputting said bit-pattern from said bit-pattern generator when a value counted by said counter reaches a predetermined value and for starting said shifting again when said output of said bit-pattern is completed;

a second adder for performing modulo-2 addition of a first sequence output from said first code generating circuit and a second sequence output from said second code generating circuit so as to generate a third sequence; and a third adder for performing modulo-2 addition of an output from said combinational logic circuit in said first code generating circuit and an output from said combinational logic circuit in said second code generating circuit so as to generate a shifted sequence of said third sequence.

* * * * *

UNITED STATES PATENT AND TRADEMARK OFFICE
CERTIFICATE OF CORRECTION

PATENT NO. : 6,064,690  
DATED : May 16, 2000  
INVENTOR(S) : Zhou et al.

Page 1 of 1

It is certified that error appears in the above-identified patent and that said Letters Patent is hereby corrected as shown below:

Please correct the Title page of the Grant to read as follows:

-- [30]        Foreign Application Priority Data

May 13, 1997 [JP] Japan......................09-137463  
July 7, 1997   [JP] Japan......................09-196536  
July 28, 1997 [JP] Japan......................09-215469  
July 31, 1997 [JP] Japan......................09-220106

Signed and Sealed this

Thirtieth Day of October, 2001

Attest:

NICHOLAS P. GODICI  
Attesting Officer     Acting Director of the United States Patent and Trademark Office